US009314109B2

(12) United States Patent
Saunders et al.

(10) Patent No.: US 9,314,109 B2
(45) Date of Patent: Apr. 19, 2016

(54) MODULAR PLUNGER MATRIX MATTRESS

(71) Applicant: DREAMWELL, LTD., Las Vegas, NV (US)

(72) Inventors: Craig Saunders, Rocky River, OH (US);
J. Evan Spirk, Gates Mills, OH (US);
Lindsey Tufts, Eastlake, OH (US);
William E. Rabbitt, Chesterland, OH (US)

(73) Assignee: DREAMWELL, LTD., Las Vegas, NV (US)

( * ) Notice: Subject to any disclaimer, the term of this patent is extended or adjusted under 35 U.S.C. 154(b) by 255 days.

(21) Appl. No.: 14/084,869

(22) Filed: Nov. 20, 2013

(65) Prior Publication Data
US 2014/0137334 A1  May 22, 2014

Related U.S. Application Data

(60) Provisional application No. 61/728,565, filed on Nov. 20, 2012, provisional application No. 61/825,748, filed on May 21, 2013, provisional application No. 61/879,437, filed on Sep. 18, 2013.

(51) Int. Cl.
*A47C 27/04* (2006.01)
*A47C 27/06* (2006.01)
(Continued)

(52) U.S. Cl.
CPC ............... *A47C 27/04* (2013.01); *A47C 23/002* (2013.01); *A47C 23/125* (2013.01); *A47C 27/00* (2013.01); *A47C 27/06* (2013.01); *A47C 27/14* (2013.01); *F16F 3/00* (2013.01)

(58) Field of Classification Search
CPC ..................................................... A47C 27/04
USPC .................. 5/713–719, 722, 933; 267/142, 267/220–221
See application file for complete search history.

(56) References Cited

U.S. PATENT DOCUMENTS

| 52,585 A | 2/1866 | McClanatham |
| 66,849 A | 7/1867 | Johnson |

(Continued)

FOREIGN PATENT DOCUMENTS

| AT | 383260 B | 6/1987 |
| BE | 415647 A | 6/1936 |

(Continued)

OTHER PUBLICATIONS

International Search Report & Written Opinion issued in International Application No. PCT/US2013/070907, dated Feb. 19, 2014; 14 pages.

(Continued)

*Primary Examiner* — Fredrick Conley
(74) *Attorney, Agent, or Firm* — Cantor Colburn LLP

(57) ABSTRACT

A modular mattress includes several plunger matrix sections that each have a respective plunger matrix support platform. The several sections are configured for side-to-side assembly to form the complete matrix for the mattress. A foldable edge frame snugly receives and houses the plunger matrix sections in side-to-side relation. The edge frame also defines a flange on an internal surface of the edge frame that supports plunger matrix sections in side-to-side relation in a position allowing the plungers to move up and down within an internal space defined by the edge frame. A top pad lays on top of the edge frame and the plunger, while a cover configured encapsulates the edge frame, the plunger matrix, and the top pad into a self-contained mattress unit.

18 Claims, 24 Drawing Sheets

(51) Int. Cl.
*F16F 3/00* (2006.01)
*A47C 23/00* (2006.01)
*A47C 23/12* (2006.01)
*A47C 27/00* (2006.01)
*A47C 27/14* (2006.01)

(56) References Cited

U.S. PATENT DOCUMENTS

| | | | |
|---|---|---|---|
| 97,579 | A | 12/1869 | Wittram |
| 1,192,510 | A | 7/1916 | Fischmann |
| 1,248,671 | A | 12/1917 | Kelly |
| 1,475,010 | A | 11/1923 | Garbutt |
| 2,532,425 | A | 12/1950 | Sheneker |
| 3,081,129 | A | 3/1963 | Ridder |
| 3,252,170 | A | 5/1966 | Frye |
| 3,656,190 | A | 4/1972 | Regan et al. |
| 3,999,234 | A | 12/1976 | Regan |
| 4,449,261 | A | 5/1984 | Magnusson |
| 6,487,738 | B1 | 12/2002 | Graebe |
| 6,669,184 | B2 | 12/2003 | Cai et al. |
| 6,721,981 | B1 | 4/2004 | Greenhalgh et al. |
| 6,742,202 | B2 | 6/2004 | Jones |
| 6,996,865 | B2 | 2/2006 | Sabin |
| 8,266,747 | B1 * | 9/2012 | Sobran ............ A47C 27/003 5/200.1 |
| 8,714,531 | B2 | 5/2014 | Roma |
| 2003/0172456 | A1 | 9/2003 | Jones |
| 2004/0231057 | A1 * | 11/2004 | Sabin ............ A47C 23/00 5/716 |
| 2008/0098533 | A1 * | 5/2008 | Erdman ............ A47C 31/105 5/722 |
| 2013/0096887 | A1 | 4/2013 | Fee et al. |
| 2014/0137333 | A1 | 5/2014 | Defranks et al. |
| 2014/0137334 | A1 | 5/2014 | Saunders et al. |
| 2014/0137335 | A1 | 5/2014 | Saunders et al. |
| 2014/0137336 | A1 | 5/2014 | Defranks et al. |
| 2014/0137337 | A1 | 5/2014 | Defranks et al. |

FOREIGN PATENT DOCUMENTS

| | | |
|---|---|---|
| EP | 2225973 A2 | 9/2012 |
| FR | 2839429 A1 | 11/2003 |
| GB | 2178307 A | 2/1987 |
| WO | 0016664 A1 | 3/2000 |

OTHER PUBLICATIONS

Notification Concerning Transmittal of International Preliminary Report on Patentability (Chapter I of the Patent Cooperation Treaty), issued in International Application No. PCT/US2013/070907, dated Jun. 4, 2015; 9 pages.

* cited by examiner

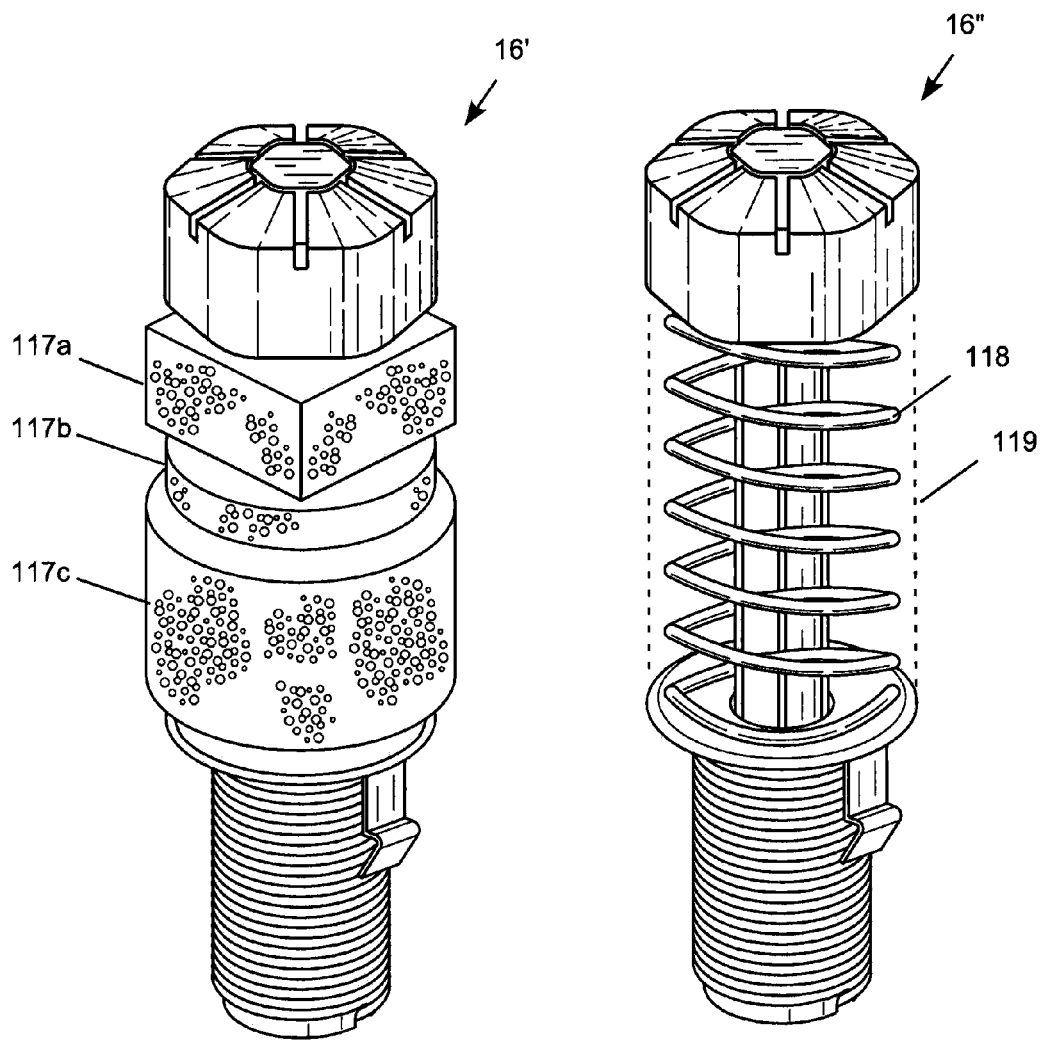
FIG. 11B  FIG. 11C

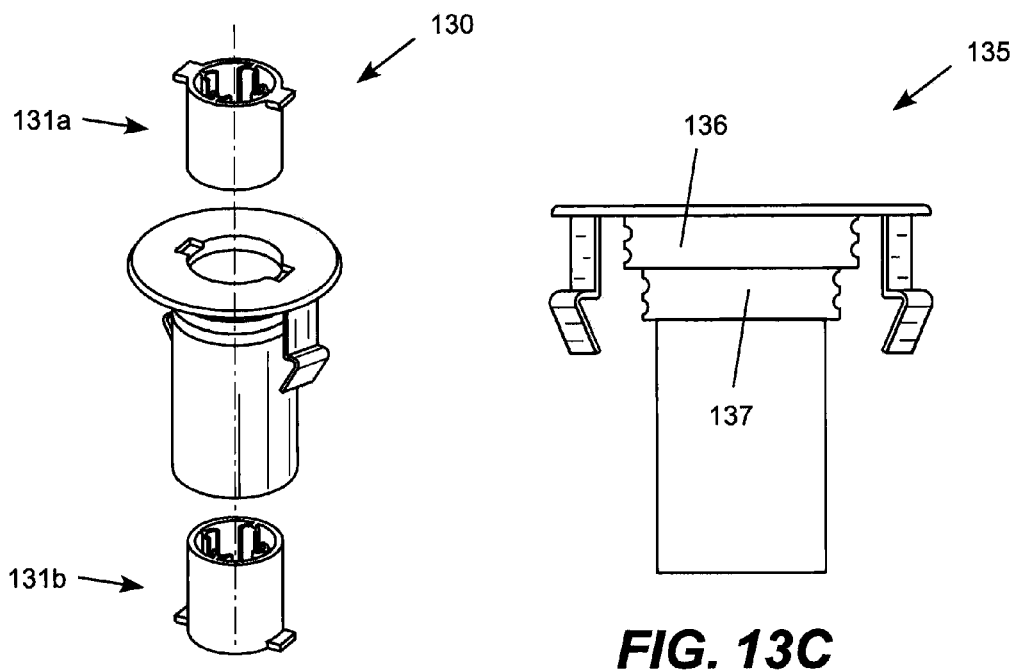
FIG. 13A
FIG. 13C
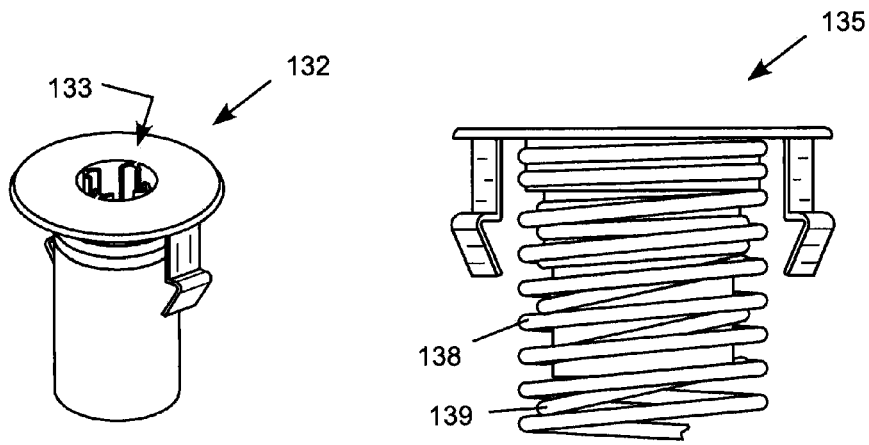
FIG. 13B
FIG. 13D

MODULAR PLUNGER MATRIX MATTRESS

CROSS REFERENCE TO RELATED APPLICATION

This application claims priority to U.S. Provisional Patent Application Ser. No. 61/728,565 entitled "Mattress Assemblies" filed Nov. 20, 2012; and U.S. Provisional Patent Application Ser. No. 61/825,748 entitled "Mattress Assemblies" filed May 21, 2013, and U.S. Provisional Patent Application Ser. No. 61/879,437 entitled "Support Systems Including Wave Springs" filed Sep. 18, 2013; which are incorporated by reference.

BACKGROUND

The present disclosure generally relates to mattress assemblies and, more particularly, to mattress assemblies including a matrix of independently movable foam padded plungers.

Standard mattress designs have evolved very little in the past fifty years. A standard mattress generally includes a set of metal coil springs mounted either on a base under a pad, or sandwiched between a pair of pads. The metal springs and pad or pads are then covered with a batting material. The entire structure is then sewn into a cloth cover and the edges are wrapped and sewn. Thus, once the mattress is fabricated, the components are not replaceable. Due to the size and inherent firmness of the metal springs, spring-based mattresses exhibit a limited ability to conform to a person's body contour, which is improved only with great difficulty. While the independent coil springs are designed to compress under a person's body weight to match the surface of the mattress to the contour of the person's body to some extent, many users still experience pressure points in certain body locations, particularly when not lying flat on their backs, leading to unnatural body positions and restless sleep.

The limitations of metal spring mattresses combined with improved quality and durability of foam products has led to the relatively recent development of the foam core mattress as a viable alternative to the coil spring mattress. A foam core mattress can provide significant improvements in body contour, elimination of pressure points, and improved comfort and support compared to conventional spring-based mattresses. A basic foam mattress typically includes one or more layers of foam having desirable properties assembled into a fabric cover which often appears identical to a standard metal spring mattress. A foam mattress may include a center core of relatively high resilience foam sandwiched between two layers of lower resilience foam encased in a fabric shell. This construction allows for a reversible mattress.

While foam mattresses overcome some of the disadvantages of coil spring mattresses, they exhibit other disadvantages including excessive firmness, difficulty adjusting the firmness, and a lack of air flow through the foam core trapping body heat within the mattress. There is, therefore, a continuing need for improved mattress designs overcoming the disadvantages of coil spring and foam mattresses.

SUMMARY

Embodiments of the present invention meet the needs described above in a modular plunger matrix mattress that includes a number of independently movable foam padded plungers that form an array of independently movable points of support. The plunger matrix mattress significantly improves body contouring over conventional coil spring mattress designs. The plunger matrix mattress also allows substantial airflow through the mattress improving over conventional foam mattress designs. Different plungers may have different spring and dampening characteristics to allow different plungers and plunger zones of the mattress to exhibit different firmness levels. In certain embodiments, individual plungers may be removed and replaced independently, for example to replace the plunger with another plunger with a different spring or dampening element, and make other types of adjustments and repairs. A variety of optional design features and configurations provide for a wide range of alternative configurations with differing levels of sophistication and functionality that can be deployed in a variety of combinations to produce a range of models designed to meet differing customer preferences and price points.

In a particular embodiment, the modular mattress includes several plunger matrix sections that each have a respective plunger matrix support platform. The several sections are configured for side-to-side assembly to form the complete matrix for the mattress. A foldable edge frame snugly receives and houses the plunger matrix sections in side-to-side relation. The edge frame also defines a flange on an internal surface of the edge frame that supports plunger matrix sections in side-to-side relation in a position allowing the plungers to move up and down within an internal space defined by the edge frame. A top pad lays on top of the edge frame and the plunger, while a cover encapsulates the edge frame, the plunger matrix, and the top pad into a self-contained mattress unit.

The disclosure may be understood more readily by reference to the following detailed description of the various features of the disclosure and the drawings included therein.

BRIEF DESCRIPTION OF THE SEVERAL VIEWS OF THE DRAWINGS

The Figures provide various embodiments and components of a plunger matrix mattress providing a large number of independent suspension points.

FIGS. 11A-11C are perspective views of alternative plunger designs for the plunger matrix mattress.

FIGS. 13A-13D are views showing alternative plunger pin guide designs for the plunger matrix mattress.

DETAILED DESCRIPTION

Figure 1:
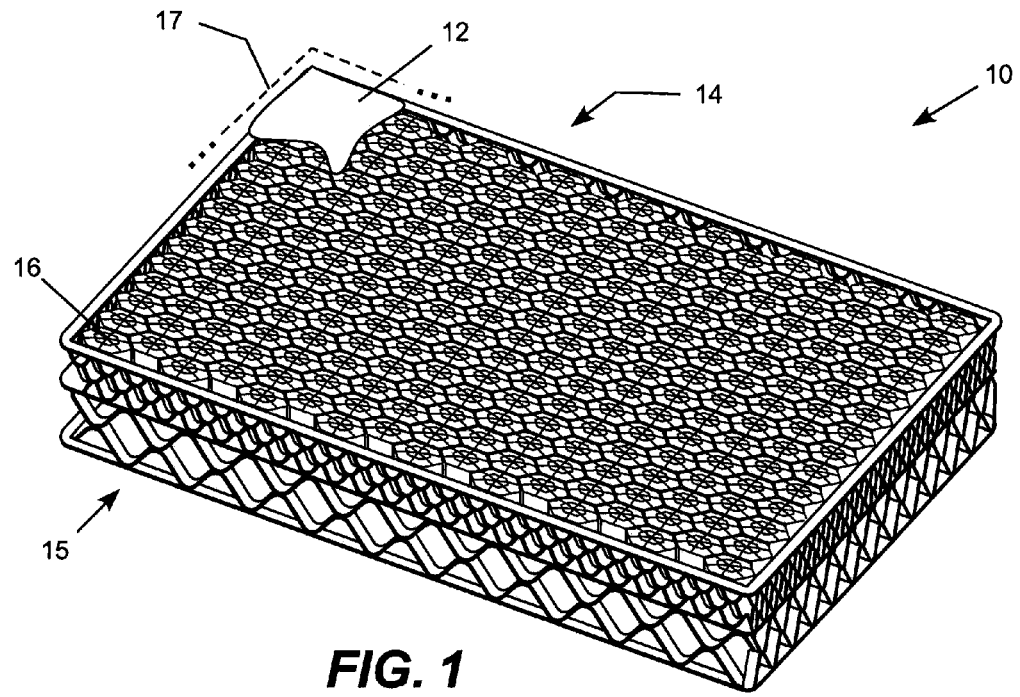
FIG. 1 is a perspective view of a first illustrative embodiment of the plunger matrix mattress.

Embodiments of the present invention may be realized in a modular plunger matrix mattress providing an array of independently movable points of support that significantly improve body contouring and support over conventional coil spring mattress designs. Unlike conventional mattresses, the plunger matrix mattress provides users with improved support when the user is not lying flat on the mattress. While conventional mattresses give support when the user is lying on their back, the support becomes very uneven when the user is not lying flat, for example when lying on their side, on a pile of blankets or on a pillow. The plunger matrix system affords a much greater range of vertical deflection, which enables the mattress to properly align the user's body even when the user is lying on an obstruction or otherwise in an unnatural position. The plunger matrix mattress also allows substantial airflow through the mattress improving over conventional foam core mattress designs.

Unlike conventional mattresses, the individual plungers may be configured with different springs, plunger heads, and dampening elements to provide plungers or plunger zones with differing firmness characteristics. Individual plungers may also be removed and replaced independently to change the firmness characteristic of individual plungers and make other types of adjustments and repairs after the mattress has been manufactured. Different plungers with different springs, heads and dampening elements exhibiting different firmness and other characteristics may be arranged into a wide range of different support zones exhibiting different, customizable support profiles. For example, zones with different firmness may be provided for head, shoulder, back, bottom, and leg sections of the mattress. Each mattress may have a custom support profile specified by the customer. In mattress designed for two persons, independent side-by-side support profiles may be configured for each person sharing the mattress. Plunger matrix designs may be incorporated into flat mattresses as well as folding embodiments designed for mechanically adjusting bed frames.

In one embodiment, the mattress includes a matrix of independently movable foam padded plungers, a mattress pad on top of the plungers, a frame, and a rigid plunger support platform supported by the frame. The plungers are individually suspended from the plunger platform and spring loaded to provide an independent point of support. Each plunger includes a pin configured to move up and down within a pin guide that is received within a corresponding aperture through the plunger support platform. A tension spring captured on the pin guide urges the plunger upward while allowing the pin to move downward in response to weight applied to the top of the plunger. An edge frame may surround the plungers or the portions of the plungers extending above the plunger platform to provide additional support at the edges of the mattress. Foam blocks or sections of coil springs may also be included along one or more edges of the mattress to provide additional edge support.

In a particular embodiment, nested coil springs are combined on a plunger to provide a non-linear spring characteristic. As another option, different plunger may be configured with different height adjustment collars to adjust the maximum travel and spring characteristic of the plunger. A wide range of different plunger head shapes and sizes may be combined to create a variety of mattress configurations. For example, a variety of foam caps configurations may be utilized within the same mattress, such as hexagonal, dome shaped, tessellation geometries, and designs with various protrusions on the top surface to provide massage sensation and compelling aesthetic designs. The plunger may also include a dampening device, such as a foam collar around the shaft of the pin above plunger support platform to provide a non-linear load-deformation response and/or dampen the spring action of the plunger. The foam collars, which may be removed by way of a longitudinal slit though the collar or by removing the pin from the plunger, may be unitary or segmented with different foam sections exhibiting different levels of firmness. The foam collar segments may have varying materials, density, height, width and other characteristics. In a particular design, for example, the segmented collar may include sections exhibiting progressive firmness. As another alternative, the dampening device may be a coil spring, which may be located under a cover and combined with a foam component to reduce noise and improve the dampening effect.

Various embodiments of the mattress may include a cover or perimeter encasement having a webbed, foam encasement, polyurethane or polyethylene foam or other suitable construction. The mattress may be located within a zip-on or other type of cover to encapsulate and protect the internal mattress assembly. In this particular configuration, the plungers are located within the envelope of the mattress. In other designs, the plungers may extend below the bottom surface of the mattress into the foundation below. A variety of selectable covers may be provided, such as waterproof covers, washable covers, covers with extra batting, decorative designs, and so forth.

A particular alternative has a modular design including a sectioned plunger matrix, folding edge frame, top pad and zip-on cover configured for shipping in several cartons. Another embodiment includes a segmented, folding plunger matrix configured to flex on top of a mechanically adjustable frame. A variety of foam block, coil spring, plunger design, edge frame, plunger head, mattress zone, replaceable parts, and other optional features provide for a wide range of alternative designs with differing levels of sophistication and functionality that can be deployed in a variety of combinations to produce a range of models designed to meet differing customer preferences and price points. For all embodiments described below, a range of details and optional features, such as foam layers, membranes, vents, component covers, vibration dampeners, shock absorbers and the like have been omitted to avoid cluttering the diagrams and may be included as standard or optional features.

Turning now to the figures, FIG. 1 is a perspective view of a simplified embodiment of the plunger matrix mattress 10 illustrating certain basic components of a typical mattress. The assembly includes a foam cover 12 on top of a matrix of plungers 14 surrounded by an edge frame 15. A representative plunger 16 is enumerated to aid in the description. The plunger and edge frame assembly is typically located within a cover or skirt 17 that provides a perimeter encasement to protect and may add structural integrity to the mattress. The cover typically includes vents or a breathable material to provide air flow through the mattress. While a webbed edge frame 15 is illustrated, the edge frame and perimeter encasement may be constructed of any suitable material having a range of desired configurations, such as polyurethane, polyethylene foam, structural plastic, or other suitable construction. The perimeter encasement may also employ conventional batting and fabric covering to give the plunger matrix a similar appearance to a conventional coil spring matrix.

Figure 2:
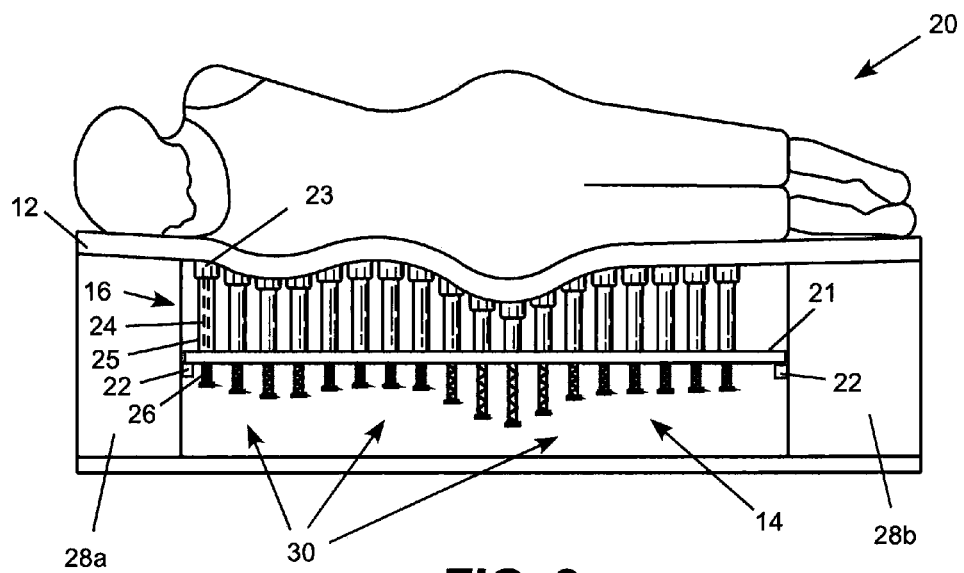
FIG. 2 is a side view of a person lying on a second illustrative embodiment of the plunger matrix mattress.

FIG. 2 is a side view of a person lying on an alternative plunger matrix mattress 20 illustrating independent plunger movement to the contour of the person's body. The basic elements of the mattress 10 include the top foam layer 12 and the matrix of independently spring-loaded plungers 14 suspended by a plunger support platform 21, which is supported by a suitable frame component 22. In certain embodiments in which the plungers are located entirely within a self-contained mattress, the frame component 22 may be formed by a flange on the inside surface of an edge frame that surrounds plunger support platform. In other embodiments, the frame component 22 may be part of a bottom frame that allows the portions of the plungers located below the plunger support platform 21 to extend into the foundation provided by the bottom frame.

Referring to the illustrative plunger 16, the plunger is suspended by a pin guide (not shown in this figure) that is captured within an aperture through the plunger support platform 21. The plunger 16 includes an upper foam head 23 carried on a plunger pin 24 that is captured within the pin guide. The pin moves up and down in the pin guide against the spring action of a tension spring 26 captured on the pin guide below the plunger support platform 21. A foam or other type of dampening collar 25 positioned around the shaft of the plunger pin located above the plunger support platform 21 is compressed during downward motion of the pin to provide a non-linear load-deformation response and/or dampen the spring action of the plunger. This particular embodiment also includes foam blocks 28a-28b alongside the plunger matrix at the head and foot of the mattress.

The representative plunger 16 moves independently against its respective tension spring 26 in response to weight exerted on the upper foam head 23 to provide the mattress with a large number of independent points of support for the person lying on the mattress. The plungers are designed to accept different springs, height adjustment collars, foam caps, and foam or coil spring collars allowing different plungers to exhibit different firmness, damping, depth of motion, and other characteristics. The full plunger matrix 14 may therefore include plungers with different springs, heads, and dampening elements to produce a configurable support profile 30. Plungers with different characteristics may be organized into a range of custom zones, which can be varied from mattress to mattress to accommodate different customer preferences.

Truly independent movement of the individual plungers through a much larger vertical range than conventional coil springs results in improved body contouring and comfort in comparison to conventional coil spring mattresses. The relatively thin top foam layer 12 and the open nature of the plunger matrix 14 allow substantial air flow through the mattress in comparison to conventional foam mattresses. Each plunger may be independently removed from the mattress after manufacture, and a different plunger configured with a different spring, dampening element, height adjustment element, or other design features may be inserted to provide an alternative plunger exhibiting different levels of firmness and other characteristics. The entire mattress is therefore configurable post-manufacturing through removal and replacement of various plungers and other components to vary the support profile 30. It should be noted that certain elements present in typical embodiments, such as an edge frame, a frame supporting the plunger support platform, a pin guide for each plunger, a cover or skirt over the mattress, and other details are not shown for ease of illustration.

Figure 3A:
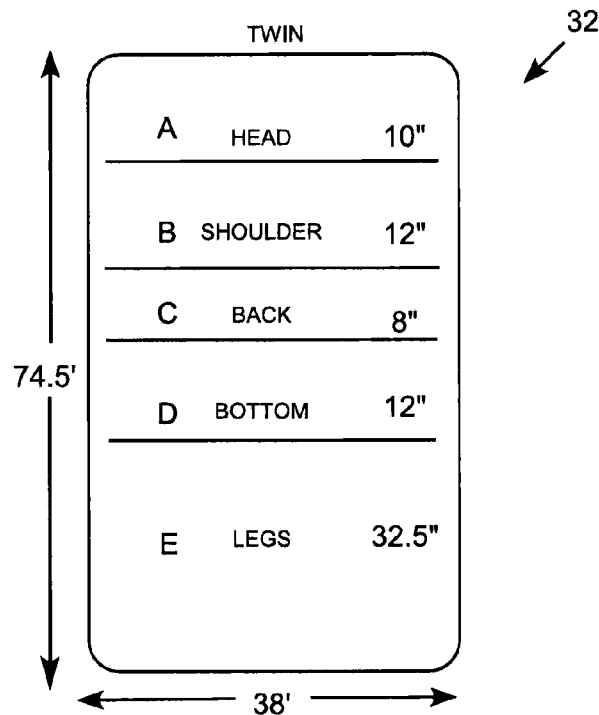
FIGS. 3A and 3B are conceptual illustrations of plunger matrix mattress illustrating different firmness zones.
Figure 3B:
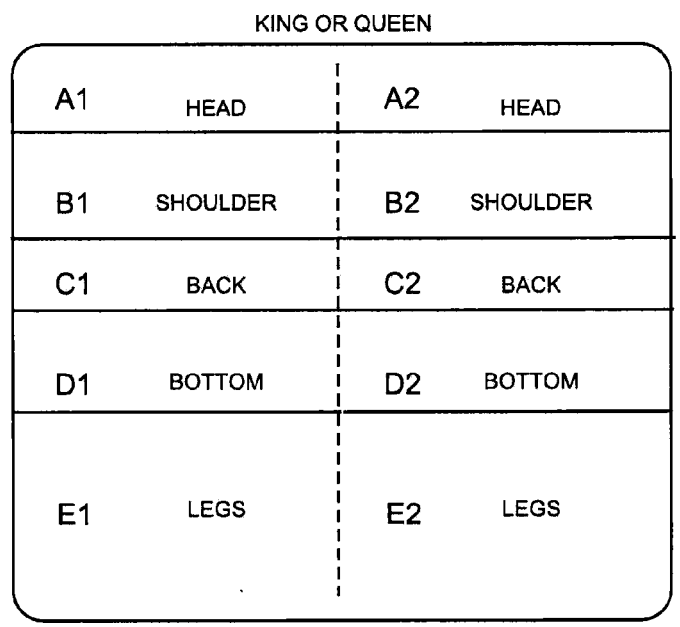

To provide an example of configurable support profile feature, FIG. 3A is a conceptual view of support profile 32 for a twin mattress divided into five firmness zones. The firmness profile of the particular example mattress is a standard twin mattress (e.g., 74.5 inches×38 inches) that includes a 10 inch long zone A (head zone), a 12 inch zone B (shoulder zone), an 8 inch zone C (back zone), a 12 inch zone D (bottom zone), and a 32.5 inch zone C (back zone). FIG. 3B is a conceptual view of a two person mattress (e.g., king or queen size) with firmness profile 34 including two sets of zones A1-E1 and A2-E2 located side-by-side. Each set of zones may exhibit different, customized support profiles for two persons who share the mattress. While a wide range of zones with different sizes, shapes and firmness characteristics may be configured, the zoning examples shown in FIGS. 3A and 3B are considered to be suitable as standard configurable zones for many users. It should be noted that the support profile of any particular mattress may be changed over time by swapping out or rearranging plungers or other components to accommodate growth, weight or preference changes of the person using the mattress.

Figure 4:
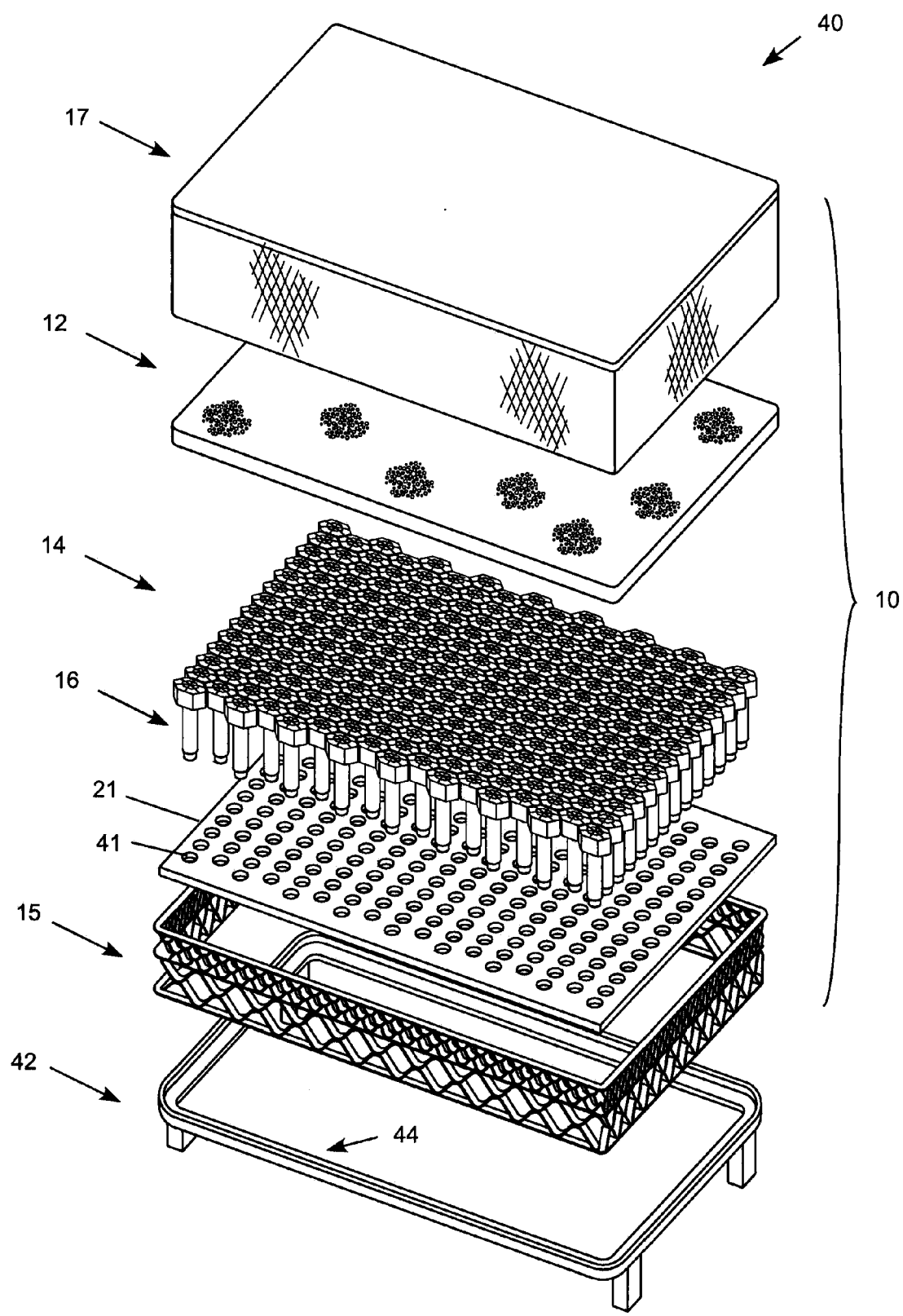
FIG. 4 is an exploded view of the first illustrative embodiment of the plunger matrix mattress.

FIG. 4 is an exploded view of a bed assembly 40 incorporating the plunger matrix mattress 10 shown in FIG. 1. The components of the mattress assembly are shown generally to scale for a twin mattress. This figure shows the plunger matrix 14 including the representative plunger 16 received within a corresponding aperture 41 through a plunger support platform 21. The plunger matrix 14 is surrounded by the edge frame 15 and the foam pad 12 sits on top of the plunger matrix 14. The cover 17 in this example may be a skirt providing mattress with protection and a pleasing outer appearance. A bottom frame 42, which may include additional cross bars and other conventional features, supports the mattress 10. In the particular example shown in FIG. 4, the bottom frame 42 includes a flange 44 that is sufficiently wide to underlie and support the edge frame 15 and an outer portion of the support platform 21.

It should be appreciated that the plunger matrix may be realized in a range of different embodiments with the plunger support platform supported in different locations in different embodiments. In the configuration shown in FIG. 4, for example, the plunger support platform 21 and edge frame 15 are both configured to sit on the flange 44 of the bottom frame 42. In the alternative configuration shown in FIG. 6, the plunger support platform 21 and edge frame 15 are both configured to sit on the frame board 66, which sits on the flange of the bottom frame 64. These configurations allow the plungers to extend into the foundation formed by the frames 42 and 62. In another configuration shown in FIG. 22, the plunger matrix may be supported by a flange 225 on the inside of the edge frame 224 with the plungers positioned to move entirely within the envelope of an integral mattress. For this embodiment, one or more top covers and zip-on envelopes may be included to add cushioning, hold the components of the mattress together and lend structural to the mattress as an integrated unit.

Figure 5:
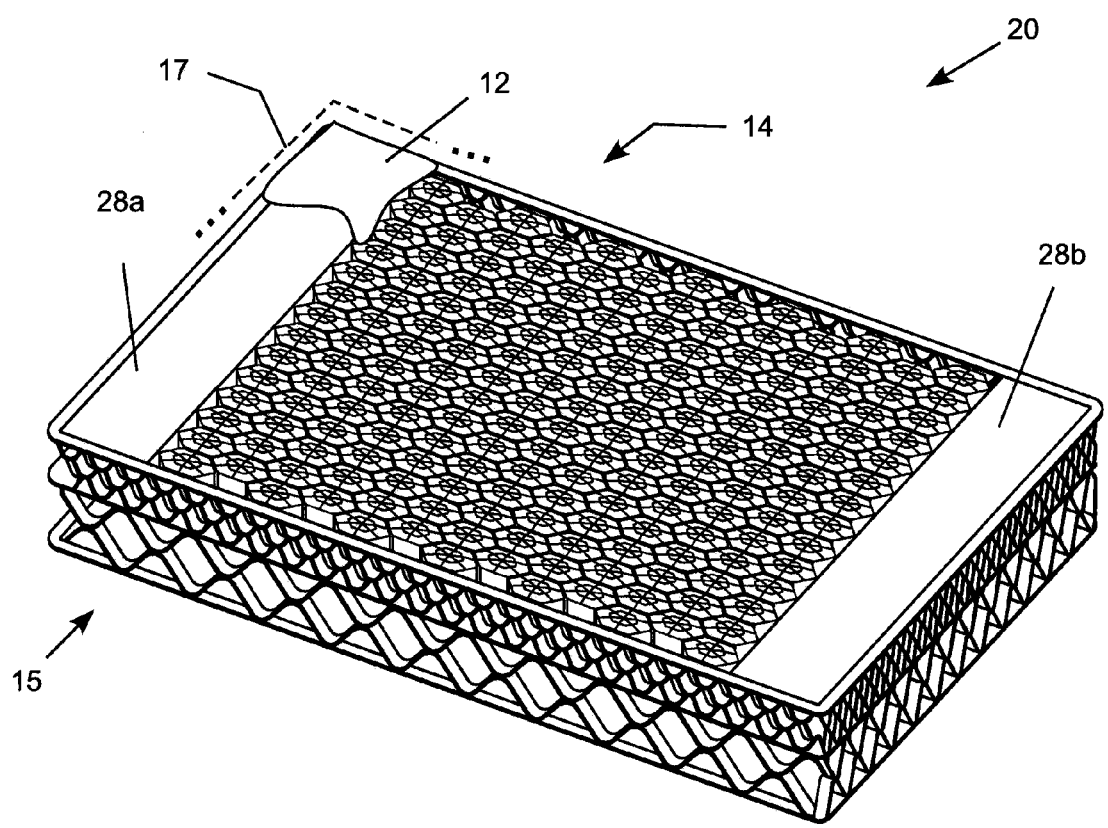
FIG. 5 is a perspective view of the second alternative embodiment of the plunger matrix mattress with foam side sections.
Figure 6:
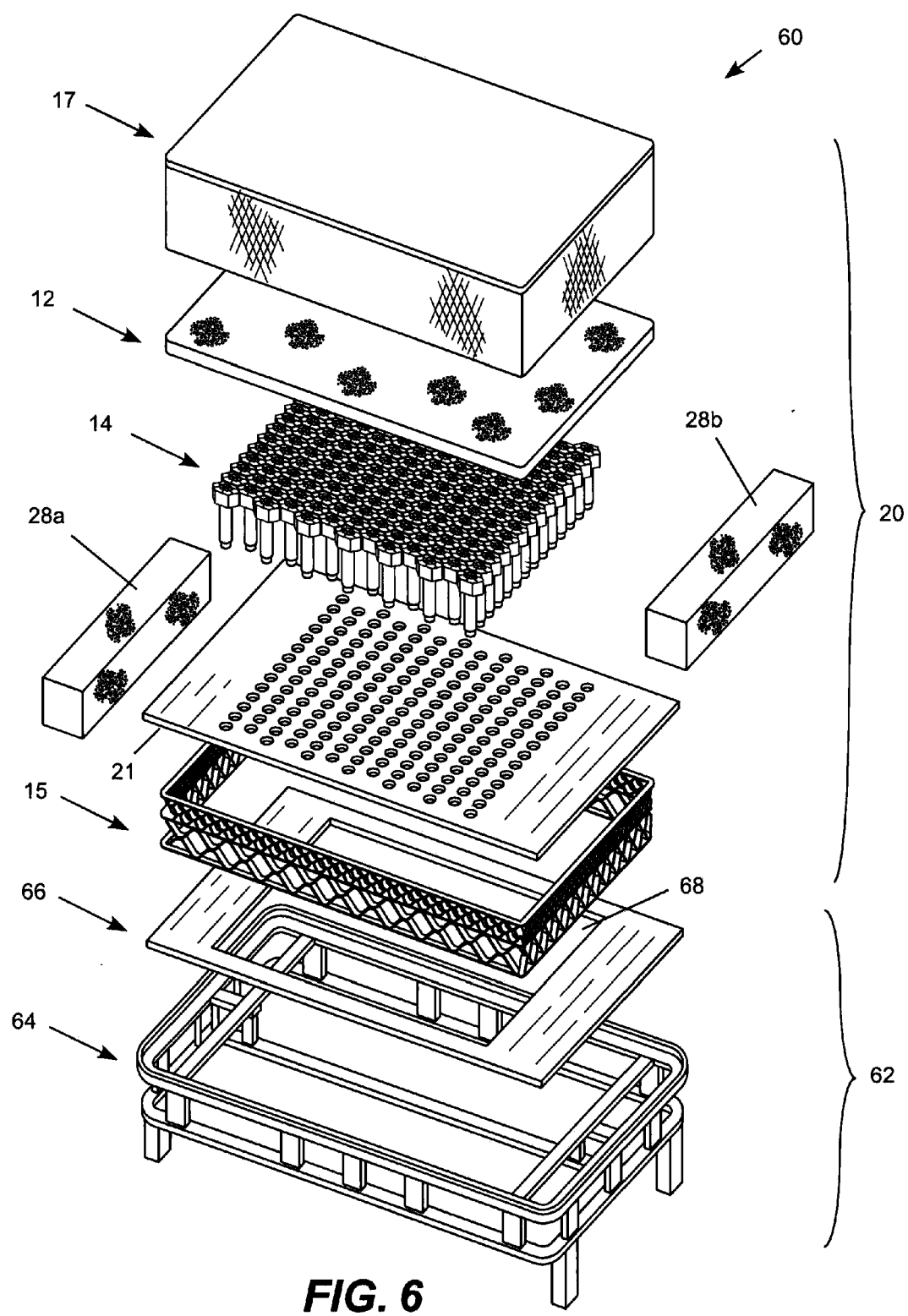
FIG. 6 is an exploded view of the second illustrative embodiment of the plunger matrix mattress

FIG. 5 is a perspective view of the alternative plunger matrix mattress 20 including foam blocks 28a and 28b located alongside the plunger matrix 14 at the head and foot sections of the mattress. FIG. 6 is an exploded view of a mattress assembly 60 including the mattress 20 and a frame assembly 62. In this embodiment, the plunger matrix 20 is supported by the frame assembly 62, which includes a bottom frame 64 and a frame board 66 supported by the bottom frame. The frame board 66 includes a window 68 sized to allow the plungers to extend through the frame board into the foundation provided by the bottom frame 64. The mattress 20 includes a foam top 12, foam blocks 28a and 28b, the plunger matrix 14 supported by the plunger support platform 21, and the edge frame 15 located under a cover 17. The edge frame 15 and the plunger support platform 21 both sit on the frame board 66, which sits on the bottom frame 64. In this particular embodiment, the edge frame is sized to cover only the upper portions of the plungers above the plunger support platform 21 with the bottom portions of the plungers extending into the foundation provided by the frame 62. The cover 17 may be a skirt that allows the plungers to extend through the frame board. The foam blocks 28a-28b produce head and foot sections with increased firmness in those portions of the mattress where the desired body contouring is low. The foam sections also provide mattress sections where a person may sit or stand without sinking excessively into the mattress.

Figure 7:
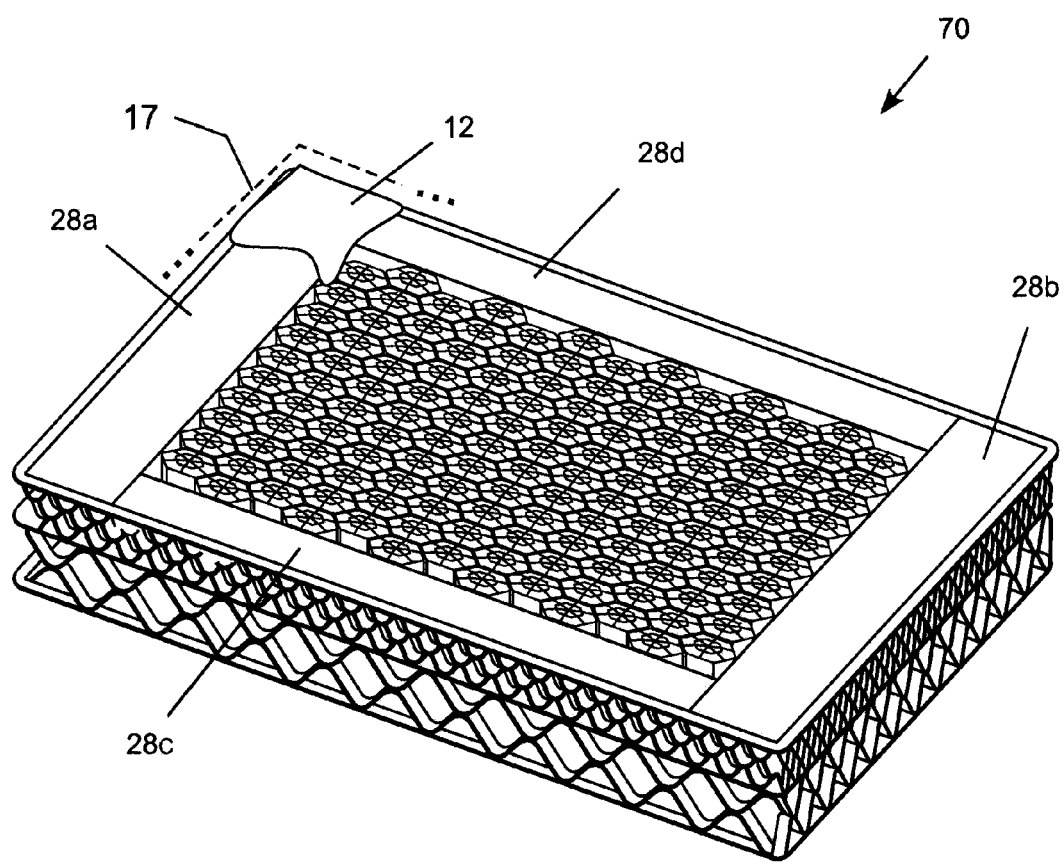
FIG. 7 is a perspective view of a third alternative embodiment of the plunger matrix mattress with a foam perimeter.

Many other mattress configurations may be designed with various combinations of plunger matrix sections, foam core sections, and coil spring sections. To provide another example to illustrate the adaptability of the design, FIG. 7 shows a mattress 70 with four foam block edge sections 28A-28D. This configuration provides increased firmness around the full perimeter of the mattress, which may be desirable for sitting on the edges of the mattress. Coil spring sections may also be utilized for the edge sections or other areas of the mattress. As another design option, coil spring may be utilized instead of foam collars on the plungers for the entire plunger matrix or in certain areas of the mattress. As another option, a section of coil springs may be placed on top of a foam block, and so forth, to create different configurations to meet different price points and customer preferences.

Figure 8A:
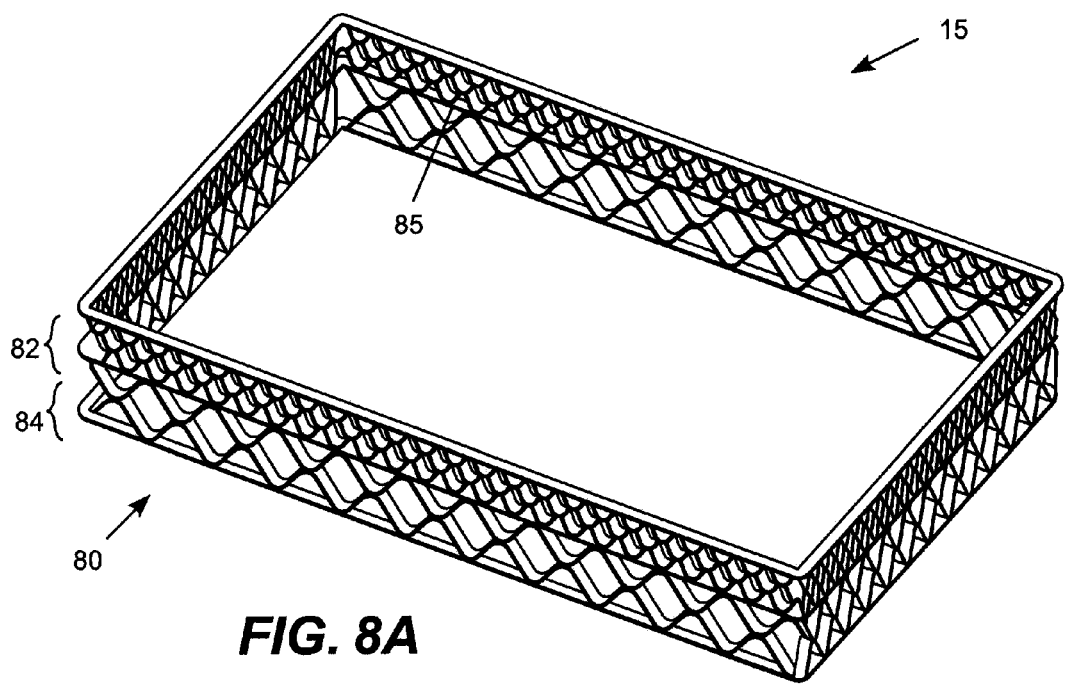
FIGS. 8A-8E are views of example patterns for an edge frame or edge cover of the plunger matrix mattress.
Figure 8B:
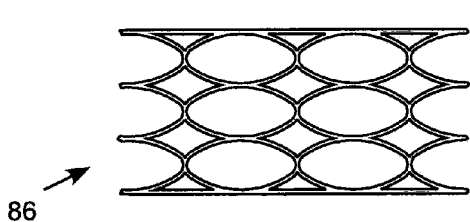
Figure 8D:
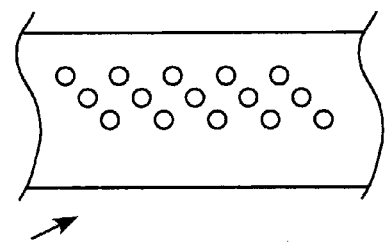
Figure 8C:
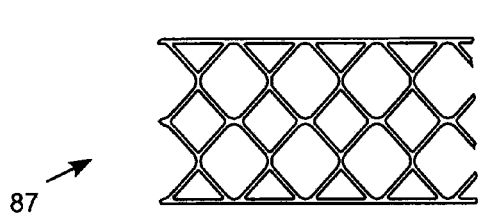
Figure 8E:
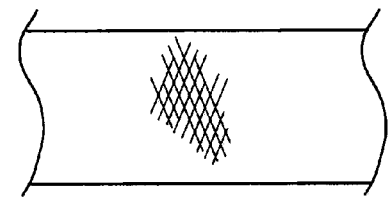

FIGS. 8A-8E are views of example edge patterns for the plunger matrix mattress. It should be appreciated that the edge of the mattress may be a structural frame (typically covered by a skirt or batting) or a zip-on envelope depending on the particular design. FIG. 8A shows an edge frame 15 with two-tiered lattice pattern 80 having an upper section 82 and a lower section 84. The upper and lower sections each include two rows of sinusoidal patterns in which the repeat pattern (sinusoidal wavelength) is shorter in the upper section than in the lower section. This design provides greater firmness in the upper section 82 than in the lower section 84 to provide a desirable support characteristic for a person sitting on the edge of the mattress. FIG. 8B shows an alternative oval lattice pattern 86, while FIG. 8C shows a diamond pattern 87. Other embodiments may have a cover on the edge and include batting or another soft material under the exterior cover. For this type of embodiment, FIG. 8D shows a ventilation pattern 86, while FIG. 8E shows a cloth exterior. These examples are merely illustrative and many other types of edge patterns and external materials may be selected as a matter of design choice.

Figure 9A:
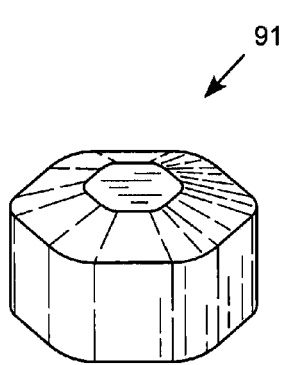
FIGS. 9A-9H are perspective views of alternative foam heads for the plungers of the mattress.
Figure 9B:
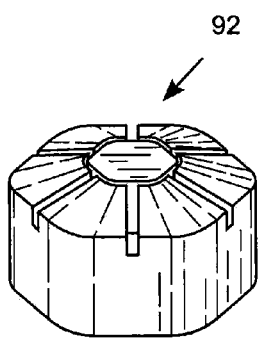
Figure 9C:
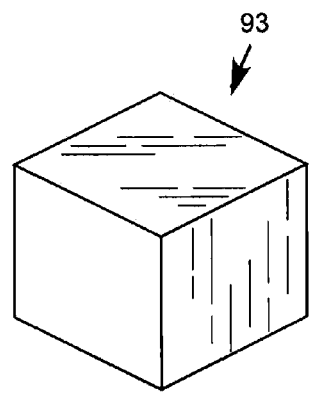
Figure 9D:
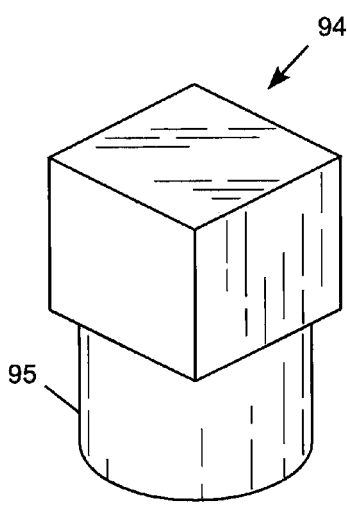
Figure 9E:
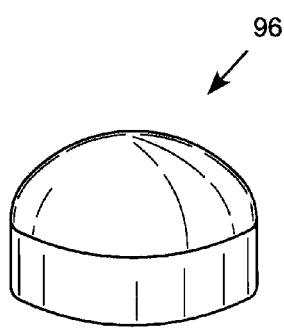
Figure 9F:
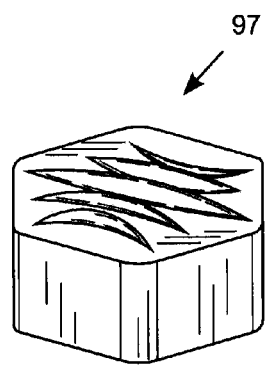
Figure 9G:
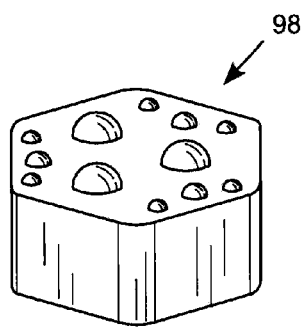
Figure 9H:
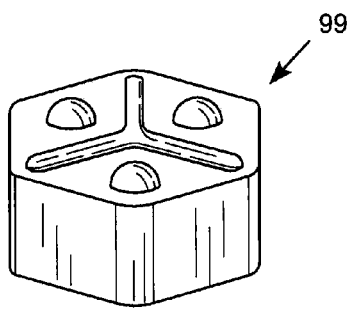

FIGS. 9A-9F are perspective views of alternative foam heads for the plungers of the mattress to provide different shapes, contact profiles, massage textures, and desirable aesthetic configurations. FIG. 9A shows a hexagonal head 91 with a smooth surface, FIG. 9B shows a hexagonal head 92 with relief slots, FIG. 9C shows a square or diamond shaped head 93, FIG. 9D shows a square or diamond shaped head 94 with an integral collar 95, and FIG. 9E shows a dome shaped head 96. Other heads may be designed to provide a massage or other tactile sensation. For example, FIG. 9F shows a hexagonal head 97 with protruding ridges, FIG. 9G shows a hexagonal head 98 with protruding dimples, and FIG. 9H a hexagonal head 99 with a combination of protruding ridges and dimples. Different mattress may include various combinations of head shapes, sizes, and surface textures to provide a wide range of potential support point configurations. The plunger heads may also be removed and replaced, as desired, after the mattress has been constructed. Again, these examples are merely illustrative and many other types of head patterns, textures, and materials may be selected as a matter of design choice.

Figure 10:
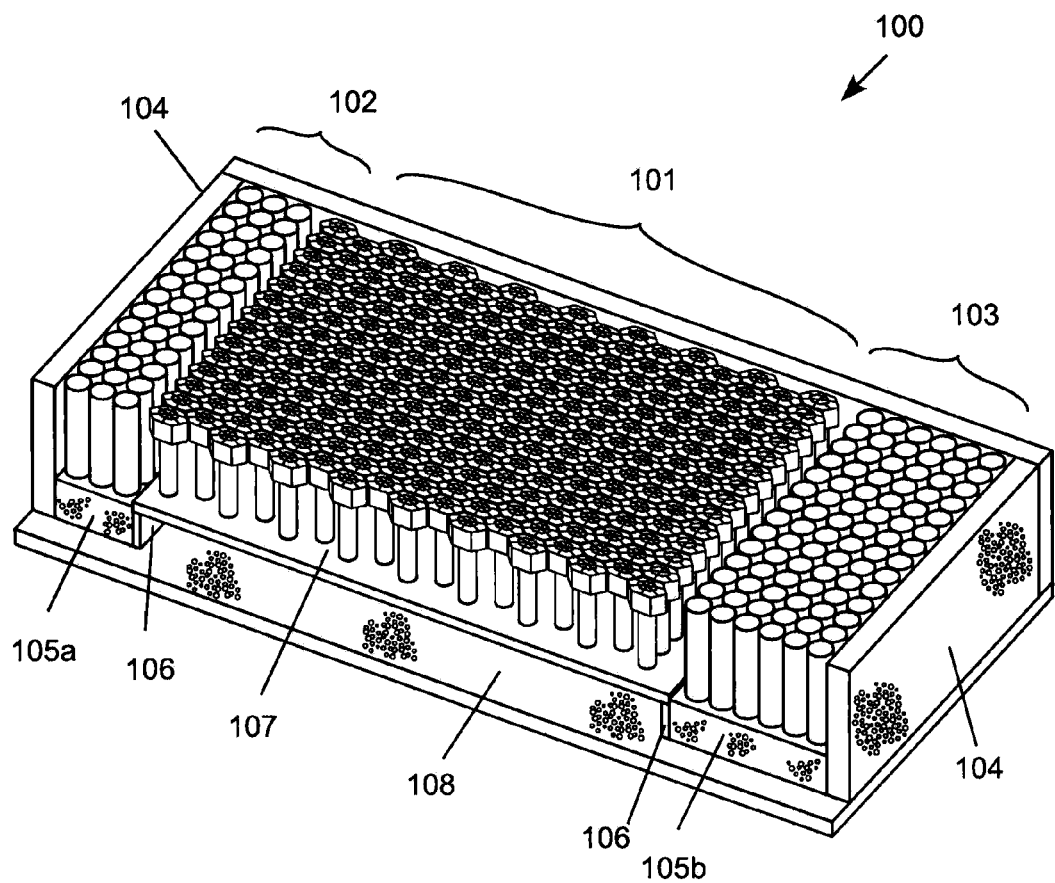
FIG. 10 is a perspective view of an alternative mattress embodiment including a combination of a plunger matrix and coil spring sections.

FIG. 10 is a perspective view of an alternative mattress design 100 that includes a combination of a plunger matrix 101, a coil spring head section 102, and coil spring foot section 103. To provide a specific example, this alternative may be configured as a mattress with 230 plungers in the matrix 101, 42 coil springs in the head section 102, and 84 coil springs in the foot section 103. The mattress includes a sturdy frame 104 around the perimeter of structural foam or another suitable material. The coil springs of the head section 102 are supported by a first foam base block 105a, and the coil springs in the foot section 103 are supported by a second foam base block 105b. A platform support frame 106 supports a plunger support platform 107, which suspends the plunger matrix 101 providing a sufficient space in the foundation formed by the support frame 196 to accommodate plunger movement. The entire structure sits on a bottom panel 108 and is typically covered by a skirt. It should be noted that certain details are omitted for ease of illustration, such as a side panel of the foam frame 106, a side panel of the platform support frame 106, the top foam pad, the skirt to expose the internal components, and other design details.

Figure 11A:
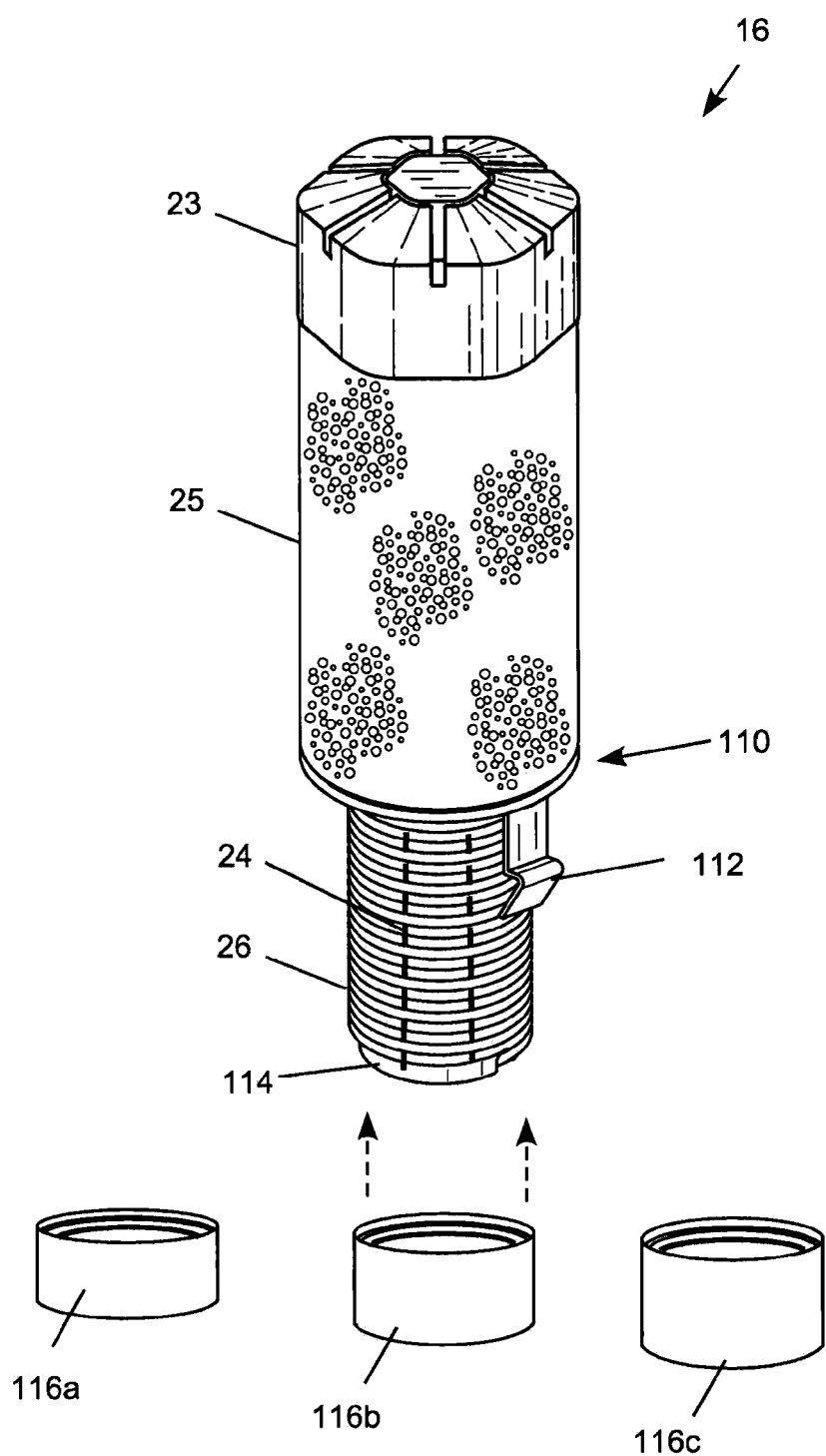

FIG. 11A is a perspective view of an illustrative plunger 16, which includes a hexagonal foam head 23, an internal movable pin 24, an external foam collar 25 on the upper portion of the pin, and a tension spring 26. This figure shows additional features including a pin guide 110 that includes a clip 112 represented by one arm of a two-arm clip enumerated in the figure for selectively securing the pin guide to the plunger support platform. The clips can be manually pinched to insert and remove the plunger from engagement with the plunger support platform. In an alternative embodiment that is not configured for removing and replacing the plunger after the mattress has been manufactured, the plunger may not include a clip and may be permanently installed in the mattress. This particular embodiment also includes a bushing 114 at the bottom of the tension spring 26 providing a dampening and noise reducing support surface for the bottom of the spring 26. As an optional feature, a number of selectable height adjustment collars represented by the collars 116a-116c may be threaded onto the spring 26 to constrain expansion of the portion of the spring captured by the height adjustment collar. The height adjustment collar prevents a portion of the spring from expanding to alter the firmness and the extension length of the spring. The height adjustment collars with different lengths 116a-116c may therefore be installed on the spring to adjust the spring characteristic and depth of travel of the plunger. The height adjustment collar may include a stop that engages with the clip 112 on the pin guide 110 or another component when the collar has been threaded to the top of the spring to prevent the height adjustment collar from backing off the spring during use of the mattress.

FIG. 11B is a perspective view of an illustrative plunger 16' showing an alternative configuration for the external foam collar surrounding the upper portion of the pin. This particular collar includes three sections 117a, 117b and 117c of differently configured foam blocks. The different blocks have different shapes, heights and widths. They may also exhibit different densities and be formed of different types of material. As an option, the sections may be configured to produce a progressive dampening effect or progressive firmness on the pin as the pin moves downward. For example, the segmented foam collar may exhibit a relatively soft firmness during initial movement pin corresponding to compression of primarily of the top layer 117a, and then becomes increasingly firm as the second layer 117b is primarily compressed, with the third layer 117c providing significantly firmer resistance to prevent the plunger from bottoming out during normal use.

FIG. 11C is a perspective view of an illustrative plunger 16" in which foam collar surrounding the top portion of the pin has been replaced by a coil spring 118. The coil spring 118 is typically located within a cover 119 to reduce noise and vibration. In various embodiments, a coil spring may be combined with one or more foam sections or layers to customize the spring rate response and dampening characteristics of the plungers. For example, a foam or other type of layer may be placed at the top and bottom ends of the coil spring to reduce spring noise and soften the feel.

Figure 12:
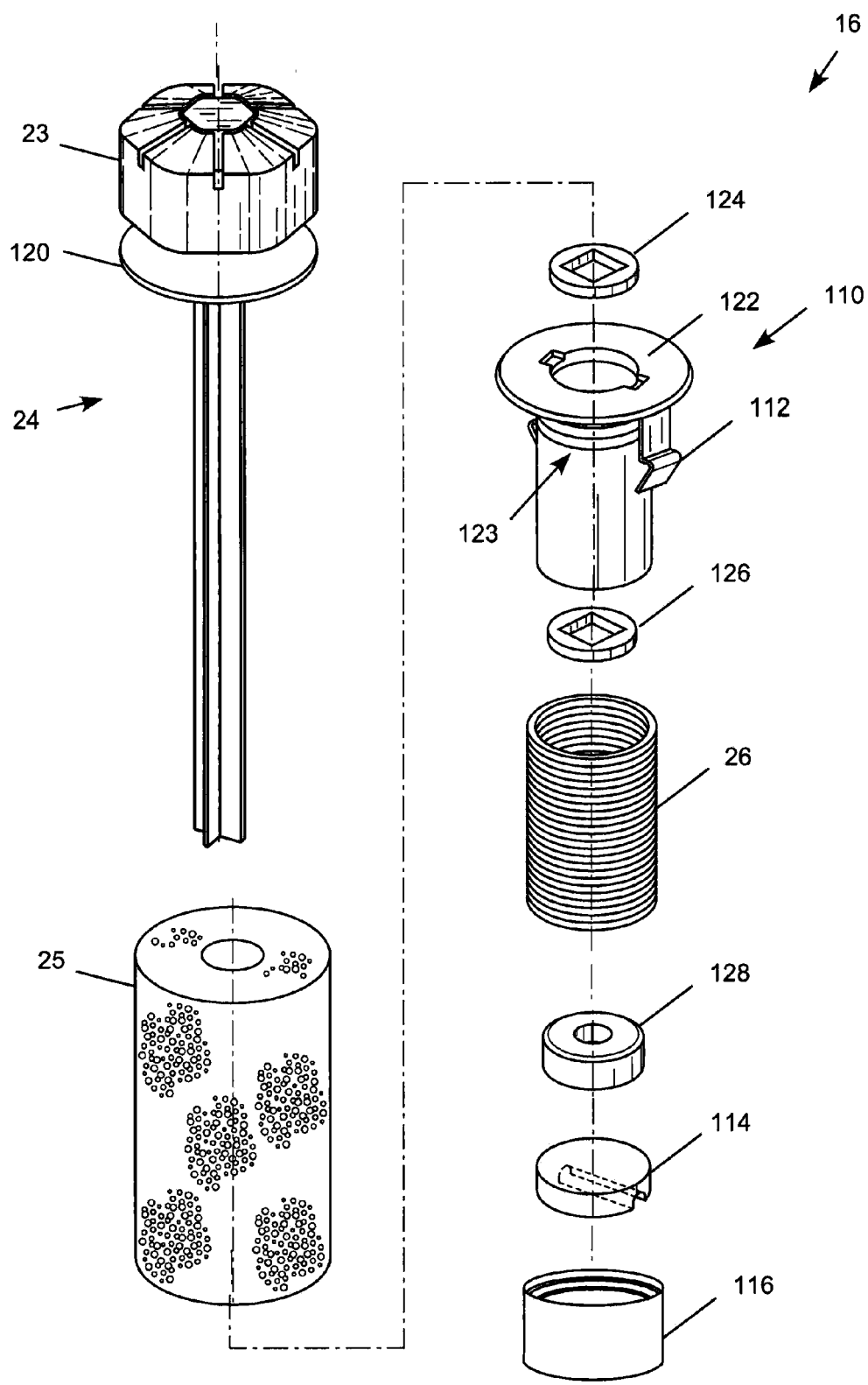
FIG. 12 is an exploded view of an illustrative plunger design for the plunger matrix mattress.

FIG. 12 is an exploded view of the illustrative plunger 16 providing a more detailed view of the components. The components are shown generally to scale for a plunger having a height of 12 inches. The foam head 23 selectively attaches to a flange 120 on the pin 24, for example through a pocket on the bottom of the foam head that receives the flange on the top of the pin. The pin moves up and down within the pin guide 110. The foam collar 25, which surrounds the top portion of the pin 24, is captured between the flange 120 of the pin and a flange 122 on the top of the pin guide 110 causing the foam collar to be compressed as the pin moves downward within the pin guide. The spring 26 is fastened a spring mount 123 (in this embodiment a robust thread) on the pin guide to firmly hold the spring to the pin guide as the spring expands in response to weight applied to the top of the plunger. A first window bearing 124 that snaps into the top of the pin guide 110 and a second window bearing 126 that snaps into the bottom of the pin guide center and stabilize the pin 24 as it moves within the pin guide. A cap 128 may snap onto the bottom of the pin to provide dampening and spread the force applied by the pin to the bottom of the spring. An additional dampening bushing 114 may be captured on an axial spur on the end of the spring 26. The optional height adjust collar 116 may be threaded onto the spring 26 to constrain expansion of a portion of the spring.

FIGS. 13A-13D illustrate various options for the pin guide. FIG. 13A shows a pin guide 130 in which the window bearings have been replaced by extended bearings 131a-131b that snap into the pin guide body to increase the support and stability provided to the pin. The shaft of the pin 24 has a "X" cross-section with four elongated fins in this embodiment, and the extended bearings 131a-131b each include four channels that receive corresponding fins of the pin while allowing the pin to freely slide within the pin guide. FIG. 13B shows another alternative pin guide 132 in which the extended bearings have been replaced by four integral channels formed on the internal surface of the pin guide.

FIG. 13C illustrates a pin guide 135 configured to engage a pair of nested tension springs. To support the springs in a nested configuration, the pin guide includes two spring mounts 136 and 137 configured to support respective upper ends of the nested springs. In this embodiment, the spring mounts are robust threads around the guide body disposed in an axially tiered relation. As shown in FIG. 13D, an outer tension spring 138 is fixed to the outer thread 136, while an inner spring 139 is fixed to the inner thread 137. Although the specific spring selected may vary, the outer spring mount 136 generally corresponds to the spring mount on a single-spring pin guide, and the outer spring 138 generally corresponds to the spring of the single-spring embodiment. In the dual-spring embodiment, the inner spring 139 is narrower and shorter than the outer spring with an upper end fixed to a second spring 137 that is just below and axially inset from the first spring mount 136 for the upper end of the outer spring 138.

Figure 14:
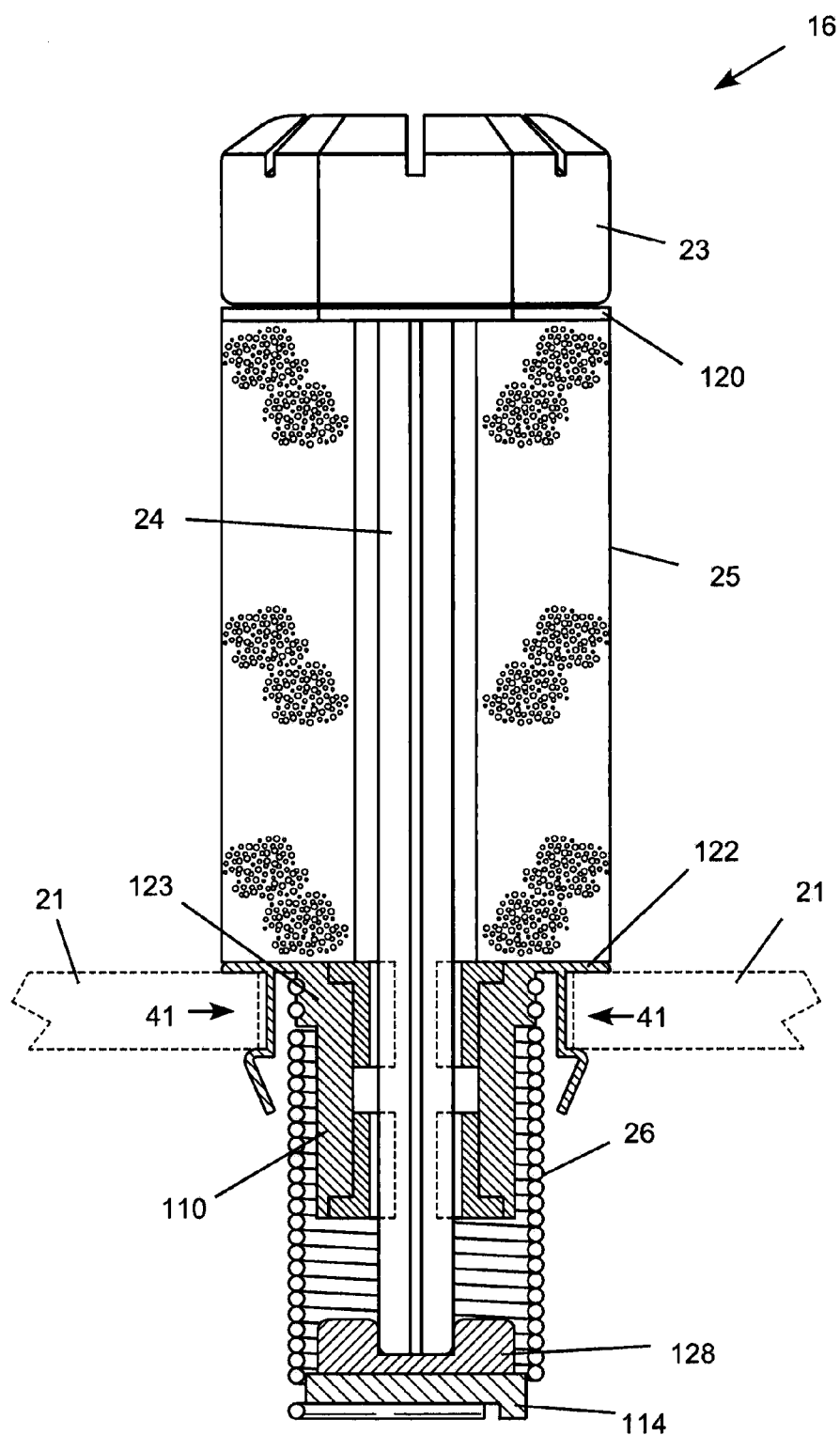
FIG. 14 is a sectional view of a first illustrative plunger in its fully raised position.
Figure 15:
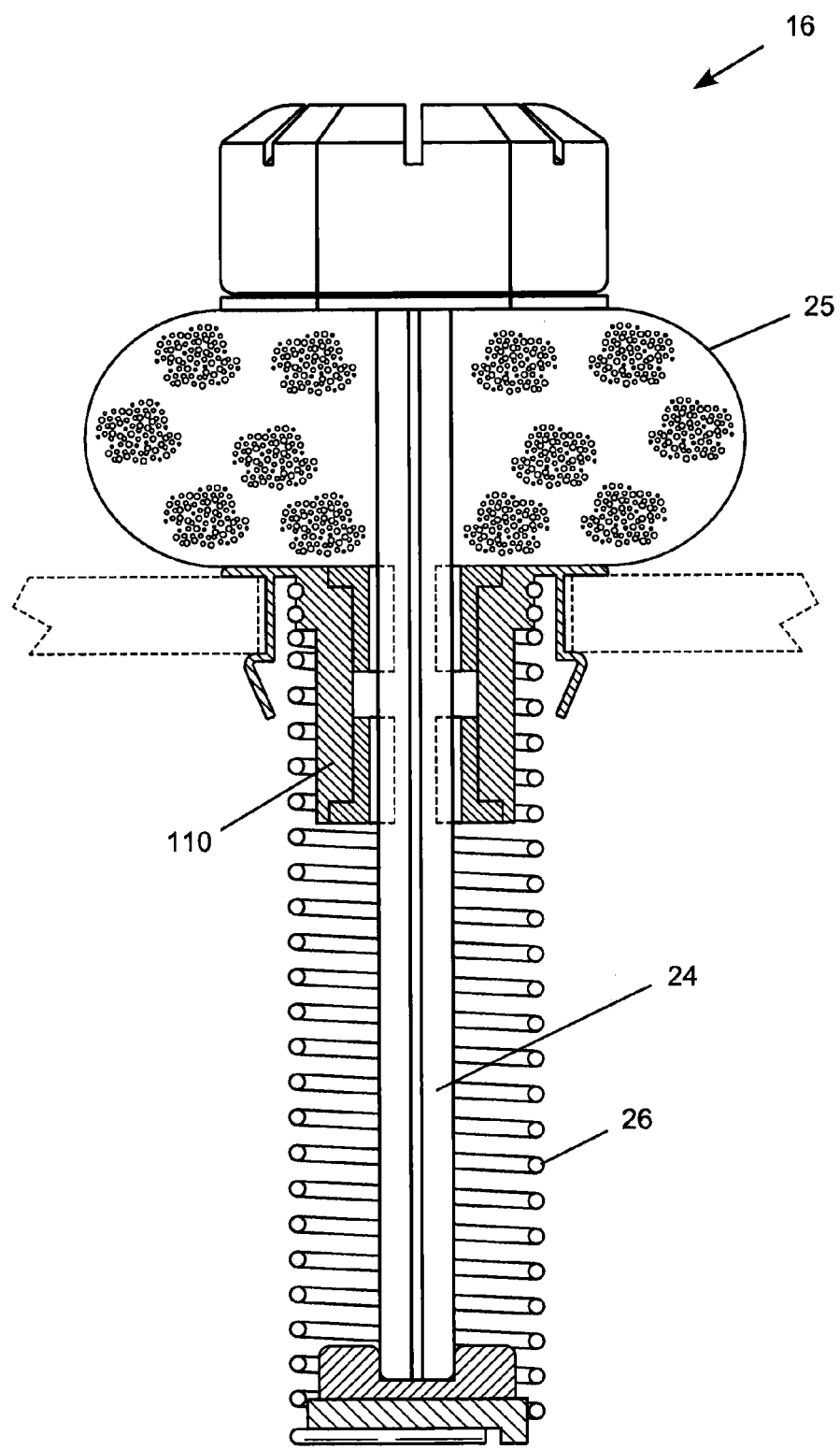
FIG. 15 is a sectional view of the first illustrative plunger in a fully lowered position.

The sectional views of FIGS. 14-15 show the operation of the single-spring embodiment. FIG. 14 is a sectional view of the plunger 16 of the single-spring embodiment with the pin 24 in its upper position. The foam head 23 is positioned on top of the pin 24, the pin is slidably received within the pin guide, and the pin guide 110 is captured within the aperture 41 through the plunger support platform 21. The foam collar 25 is captured between the flange 120 on the top of the pin 24 and the flange 122 on the top of the pin guide 110 to provide a non-linear load-deformation response and/or dampen the spring action of the plunger. The spring 26 is fastened to the thread 123 on the pin guide 110. There is a cap 128 on the bottom of the pin 22 and a flexible bushing 114 engaged with a spur on the bottom of the spring 26. FIG. 15 is a sectional view of the plunger 16 in the fully lowered position. The pin 24 has moved downward with respect to the pin guide 110, the foam collar 25 has been compressed to provide a non-linear load-deformation response and/or dampen the spring action, and the tension spring 26 has expanded.

Figure 16:
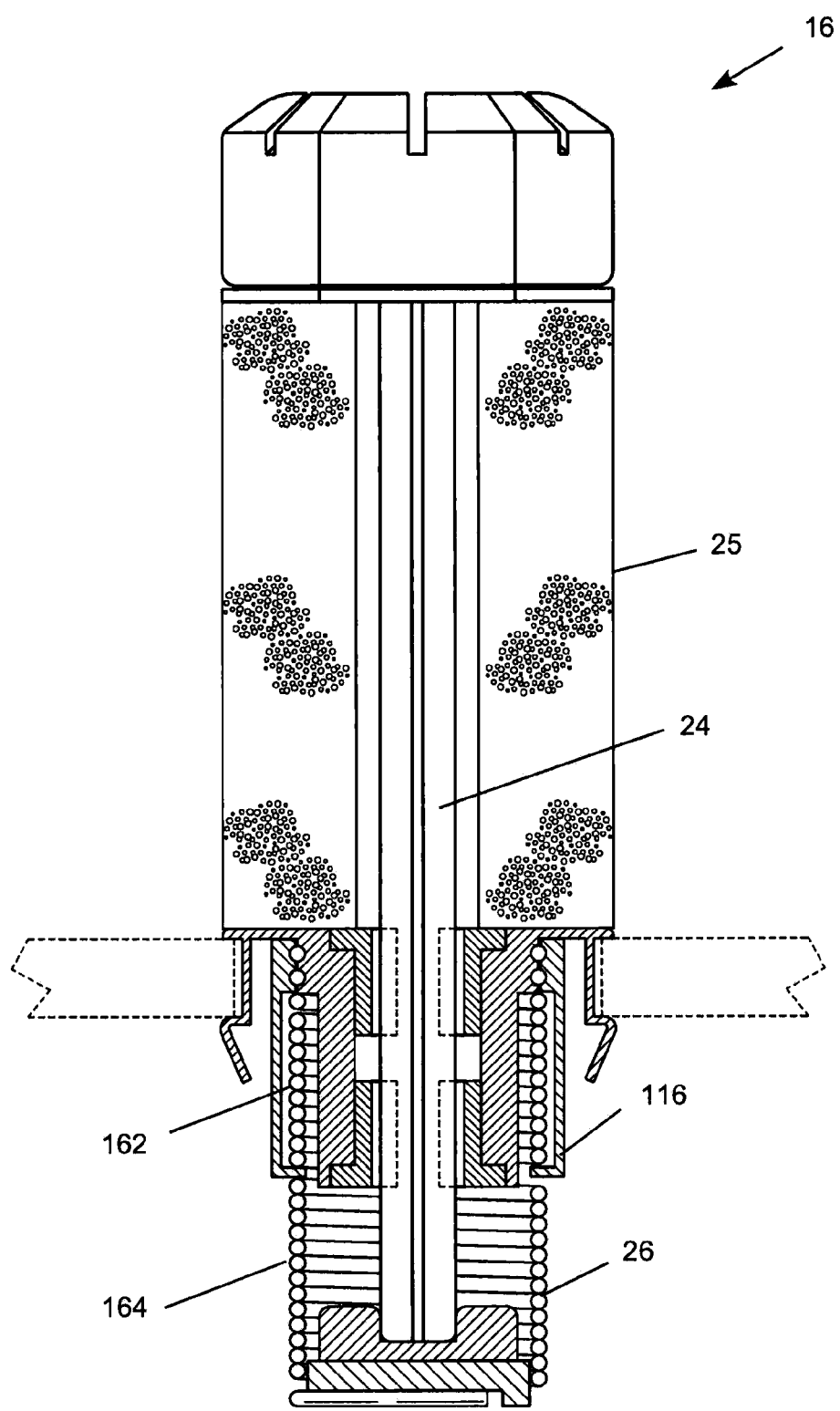
FIG. 16 is a sectional view of a second illustrative plunger with a height adjustment collar in a fully raised position.
Figure 17:
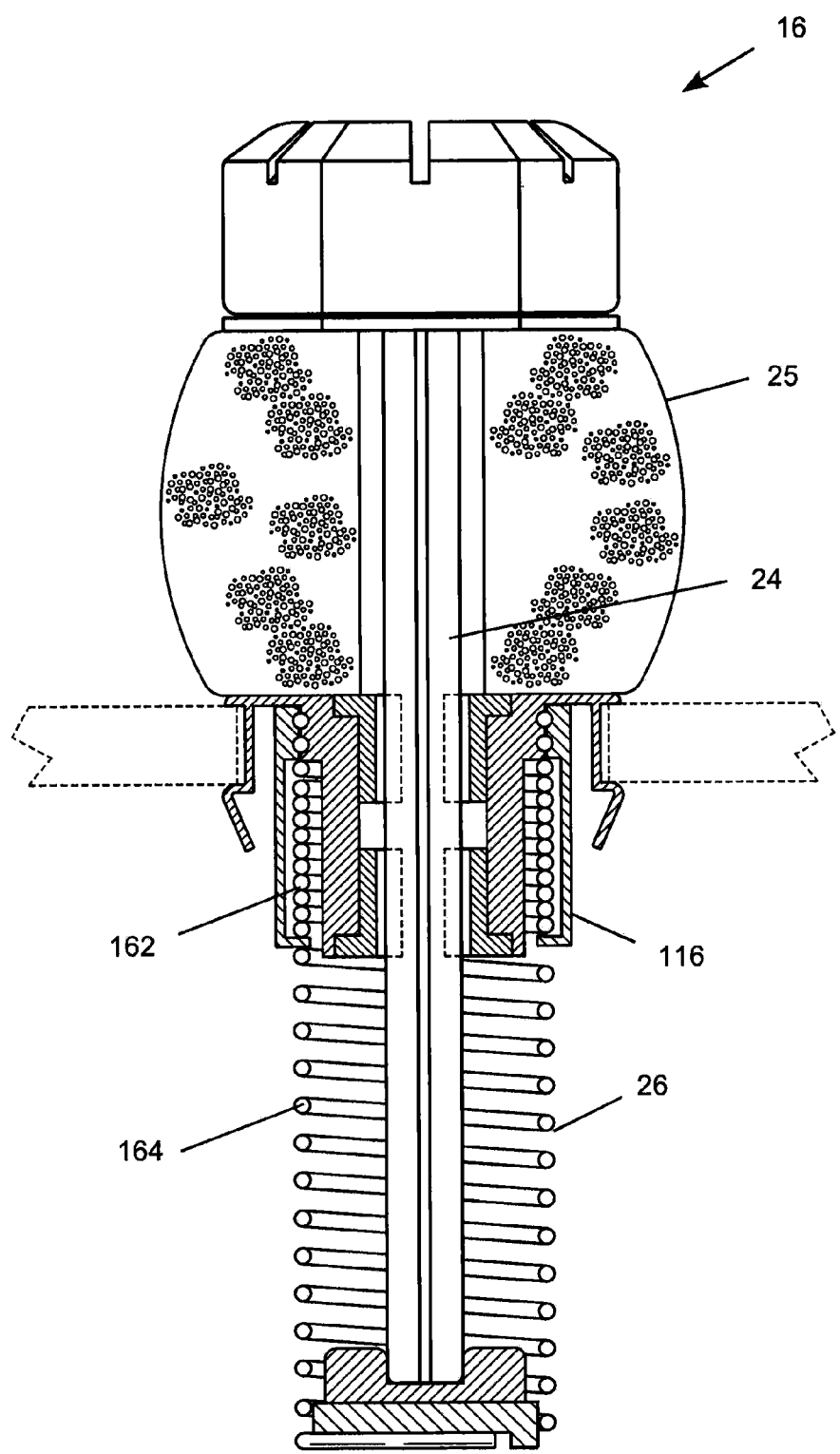
FIG. 17 is a sectional view of the second illustrative plunger with a height adjustment collar in a fully lowered position.

The sectional views of FIGS. 16-17 show the operation of the single-spring embodiment with a height adjustment collar. FIG. 16 is a sectional view of the illustrative plunger 16 with a height adjustment collar 116 in a fully raised position. The height adjustment collar is threaded onto the spring 26 to constrain expansion of an upper portion 162 of the spring, while allowing only a bottom portion 164 of the spring to expand with movement of the pin 24. FIG. 17 is a sectional view of the plunger 16 in the fully lowered position. The upper portion 162 of the spring 26 is not expanded due to the height adjustment collar 116, while the bottom portion 164 of the spring has expanded. The foam collar 25 has been compressed, but to a lesser extent than in FIG. 15 without the height adjustment collar. As noted previously, height adjustment collars with different lengths may be utilized to adjust the spring characteristic and pin travel length of the plunger.

Figure 18:
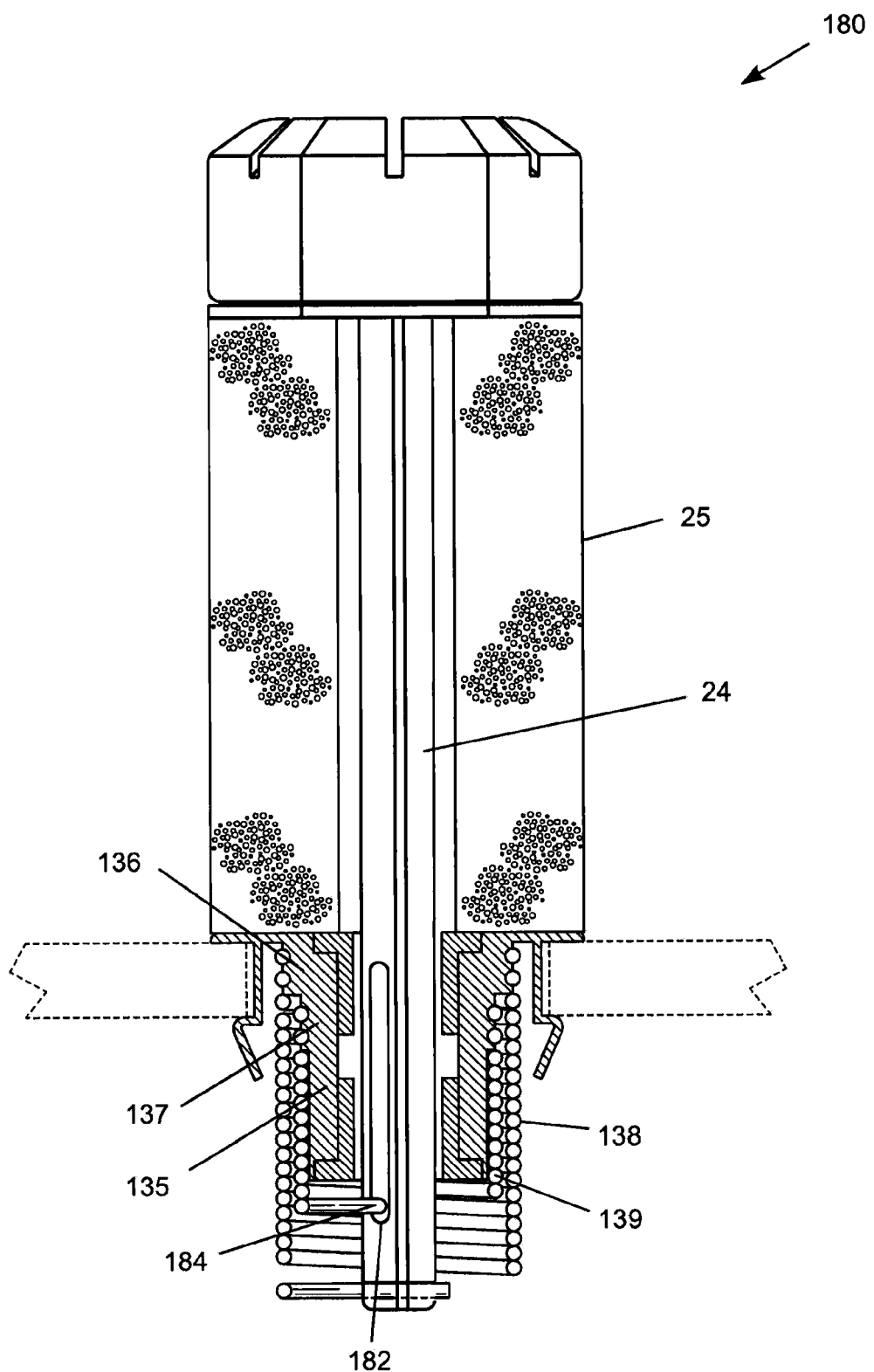
FIG. 18 is a sectional view of a third illustrative plunger with dual tension springs in a fully raised position.
Figure 19:
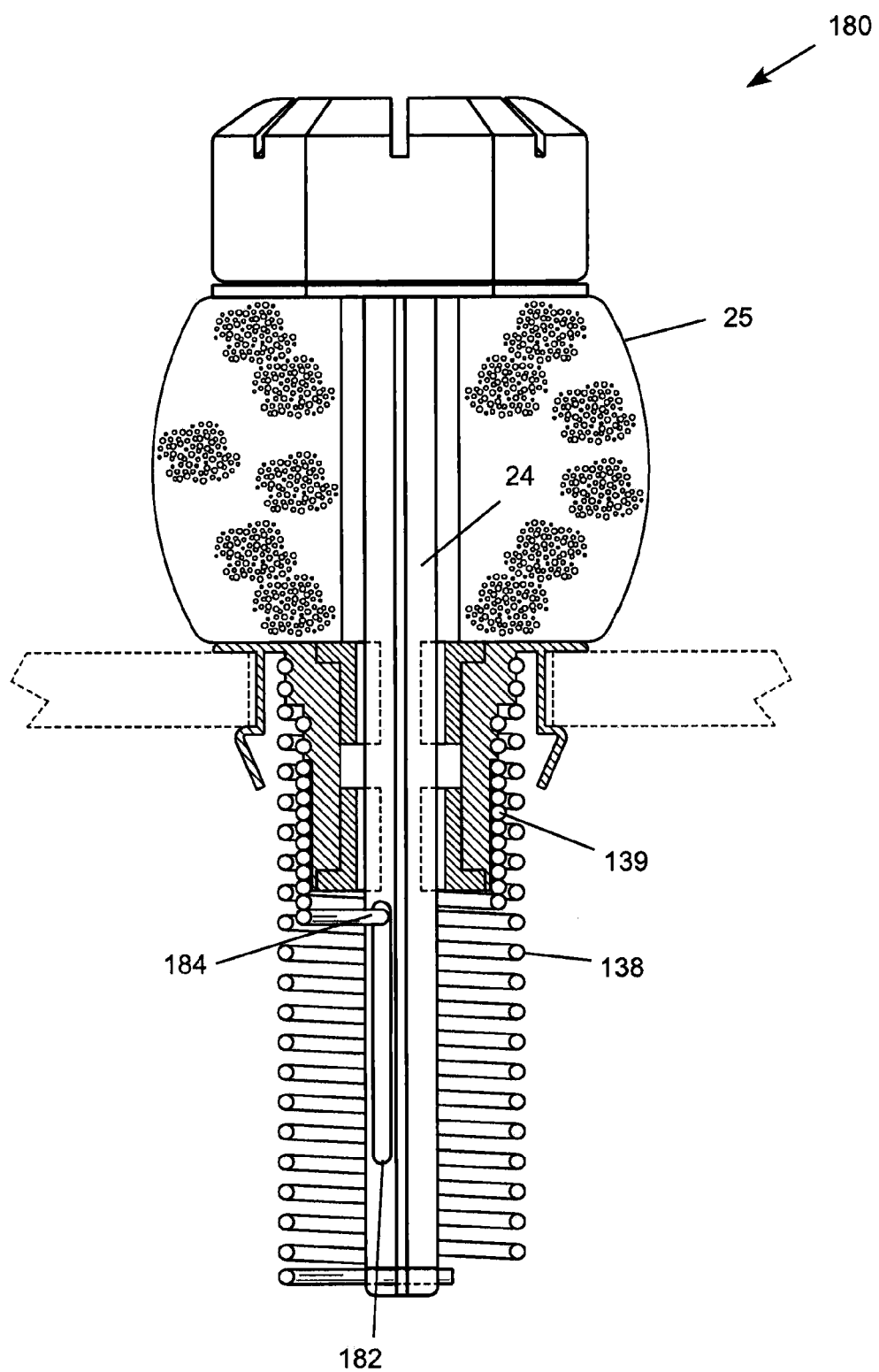
FIG. 19 is a sectional view of the third illustrative plunger with dual tension springs in a partially lowered position.
Figure 20:
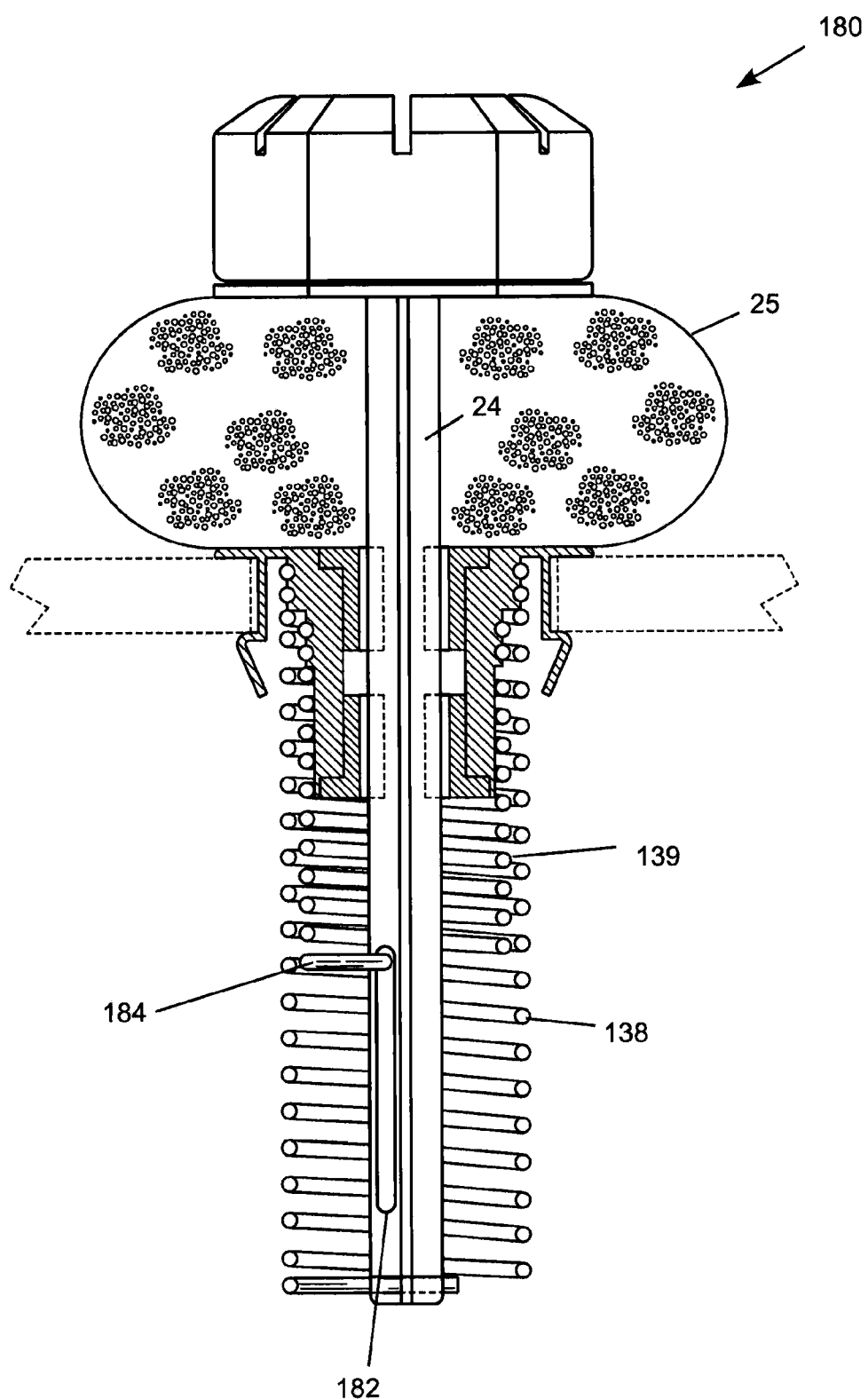
FIG. 20 is a sectional view of the third illustrative plunger with dual tension springs in a fully lowered position.

The sectional views of FIGS. 18-20 show the operation of a dual-spring embodiment. FIG. 18 is a sectional view of an alternative plunger 180 with dual tension springs 138, 139 in a fully raised position. The nested coil springs provide the plunger with a nonlinear spring characteristic by tensioning only the outer spring springs 138 during a first portion of the downward motion of the pin 24, and then tensioning both springs 138, 139 during subsequent downward motion of the pin. The plunger may be similar to the illustrative plunger 16 described previously except for the utilization of a dual-spring pin guide 135, the nested tension springs 138 and 139 (see also FIGS. 13C-13D) and an elongated slot 182 provided in a fin of the movable pin 24, which typically has a shaft with an X shaped cross-section with four elongated fins. The slot 182 extends along a bottom portion of the shaft of the pin, for example about a third of the way up the shaft. The outer tension spring 138 is fixed to an outer thread 136 and the inner tension spring 139 is fixed to an inner thread 137 on the dual-spring pin guide 135. A spur 184 on the end of the inner spring 139 is slidably captured within the slot 182, which allows the spur to slide freely within the slot during a first portion of the downward travel of the pin. The slot 182 therefore accommodates stretching of only the outer spring 138 (without stretching the inner spring 139) during an initial portion of the downward travel of the pin 24 until the point where the top of the slot 182 reaches the spur 184 of the inner spring as shown in FIG. 19.

As a result, the bottom of the pin 24 stretches the outer spring 138 throughout the entire downward travel of the pin, while the spur 184 at the bottom of the inner spring 139 slides freely within the slot 182 during an initial portion of the downward motion of the pin. The outer spring 138 is therefore tensioned by the full range of travel of the pin 24, while the inner spring 139 is only tensioned during a portion of the downward motion of the pin. That is, the inner spring 139 is not tensioned during the initial downward travel of the pin 24 while the spur 184 at the bottom of the inner spring 139 slides freely within the slot 182. FIG. 19 shows the point at which the pin 24 has moved downward a sufficient amount to cause the spur 184 to become the engage with the top of the slot 182, causing the inner spring to be tensioned by further downward motion of the pin. FIG. 20 shows the point at which the pin 24 has moved down to its fully lowered position with both springs 138, 139 tensioned. As a result, only the outer spring 138 is tensioned during the first portion of downward movement of the pin 24, while both the outer and the inner spring 138, 139 are tensioned during a second portion of downward movement of the pin.

Figure 21A:
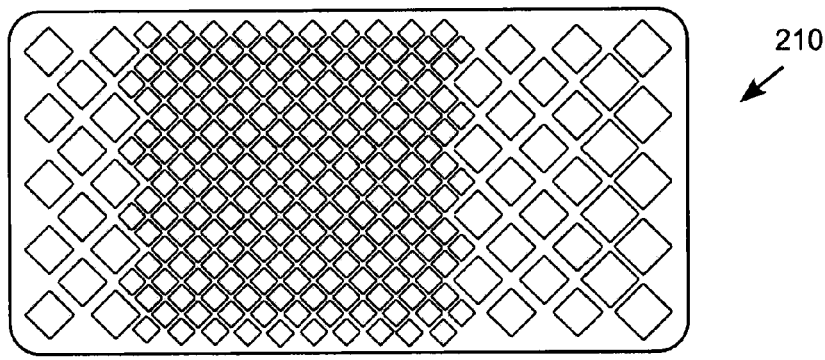
FIGS. 21A-21C show alternative variegated plunger matrix designs utilizing plunger heads having different sizes and shapes.
Figure 21B:
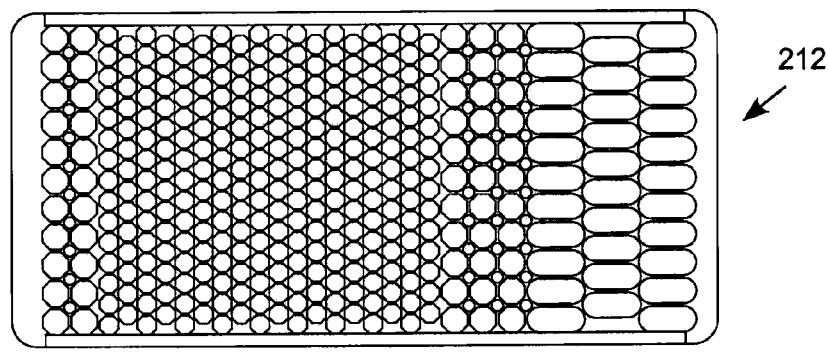
Figure 21C:
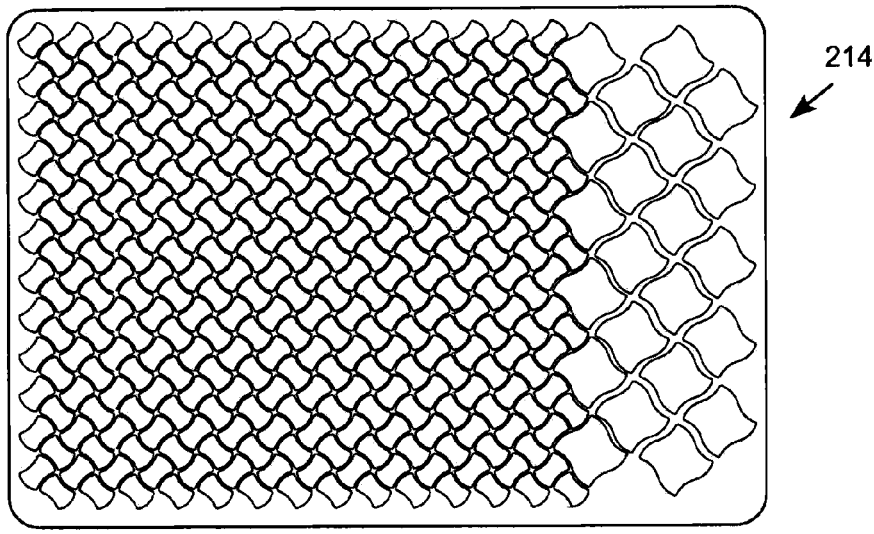

FIGS. 21A-21C show alternative variegated plunger matrix designs utilizing plunger heads having different sizes and shapes. FIG. 21A illustrates a variegated plunger matrix design 210 with square or diamond shaped plunger heads of differing sizes. FIG. 21B illustrates a variegated plunger matrix design 212 with plunger heads that differ in both size and shape. FIG. 21C illustrates a variegated plunger matrix design 214 with tessellate plunger heads that differ in both size and shape. Each design is typically configured with zones of plungers having different springs and damping characteristic to provide a customized support profile. In these examples, the different areas having similar plunger heads may represent zones with different springs and damping characteristics and the different head shapes may be designed to aid in producing a desired support profile. It will be appreciated that these examples are merely illustrative and that that may variegated plunger matrix designs using a wide range of plunger shapes and sizes may be developed as a matter of design choice. The variegated plunger matrix sections may also be combined with coil spring and foam block sections to further vary the design options.

Figure 22:
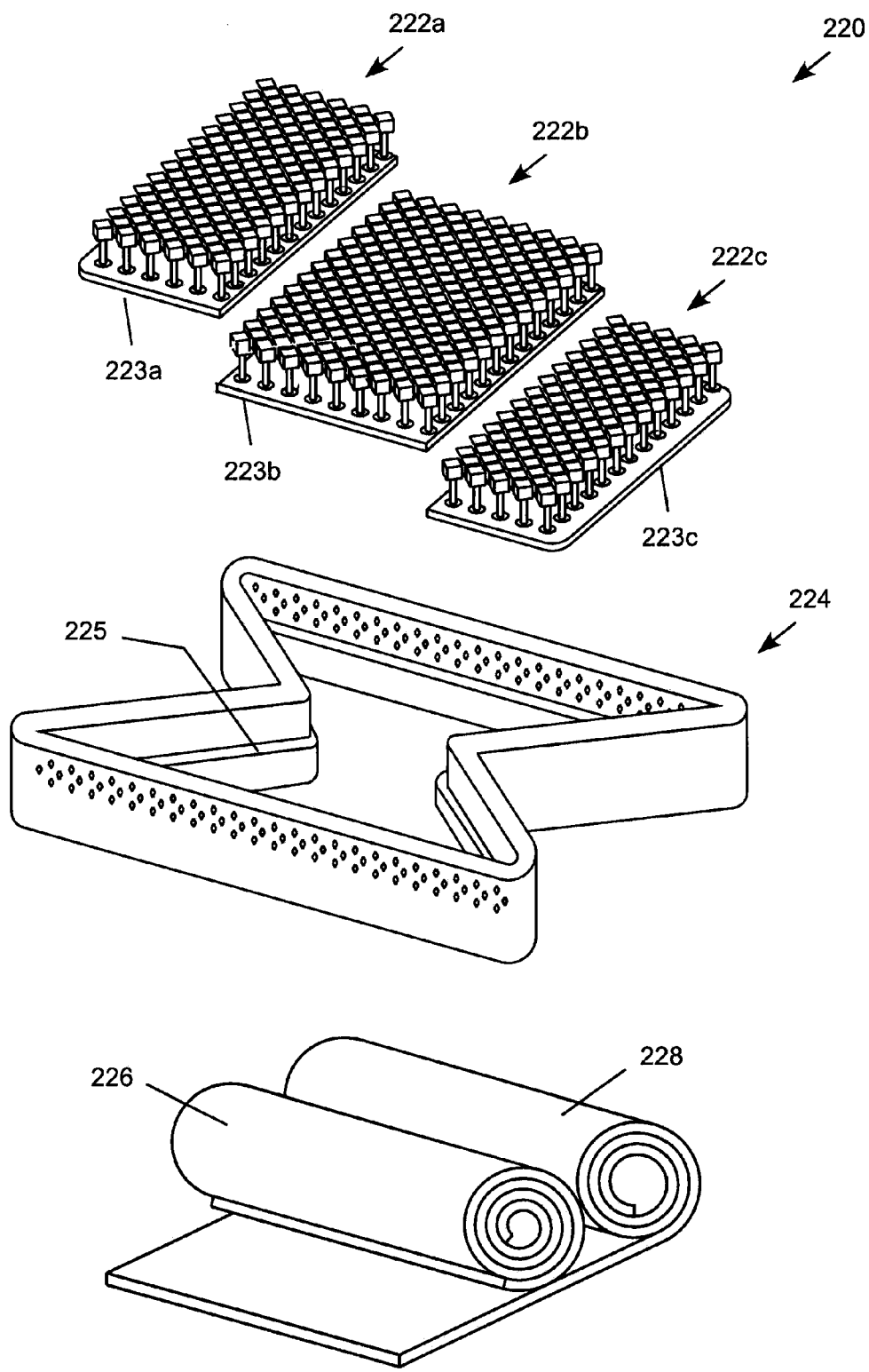
FIG. 22 is a perspective diagram showing a modular plunger matrix mattress configured for convenient shipping as disassembled components.

FIG. 22 is a perspective diagram showing a modular plunger matrix mattress 220 configured for convenient shipping as disassembled components. The plunger matrix is configured as three sections 222*a*, 222*b* and 222*c* designed to be placed side-by-side to create a standard size mattress. Each plunger matrix section includes a respective plunger support platform 223*a*, 223*b* and 223*c*, which may be configured with interlocking structures or fasteners to secure the sections together. The plunger matrix sections are sized to fit snugly within an edge frame 224 that includes a flange 225 to support the plunger support platforms in a central location of the edge frame. A top pad 226 is configured for placement over the top of the edge frame housing the plunger matrix sections. Foam layer 228 is designed to go over the plunger matrix, edge frame and top cover to protect and add structural stability to the self-contained mattress. A variety of selectable zip-on covers may be provided to go on top of the foam layer 228, for example to provide a water proof cover, a washable cover, additional batting, or a desired outer appearance of the mattress. Each plunger matrix section 222*a*, 222*b* and 222*c* may typically be shipped in a respective box, while the edge frame 224, foam pad 226, foam layer 228 and any additional covers ordered by the customer may typically be shipped in a separate box, to create a multi-box (in this example four boxes) modular mattress that can be conveniently shipped by postal or parcel delivery service.

Figure 23A:
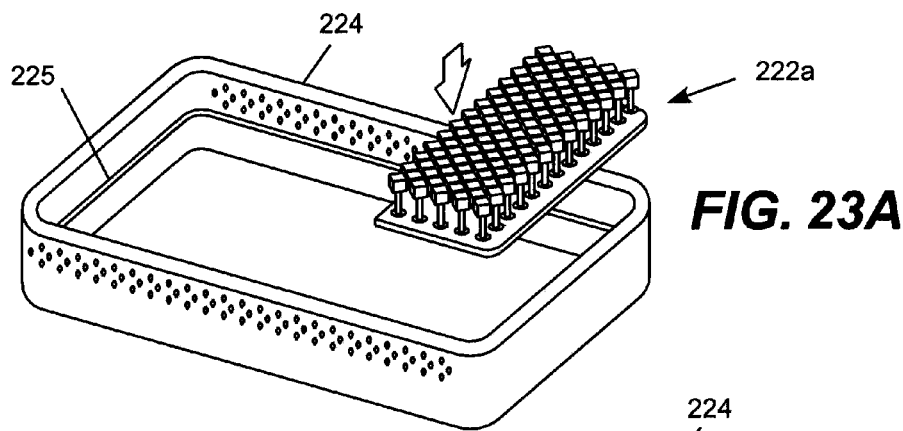
FIGS. 23A-23D are perspective diagrams illustrating a customer assembly procedure for the modular plunger matrix mattress.
Figure 23B:
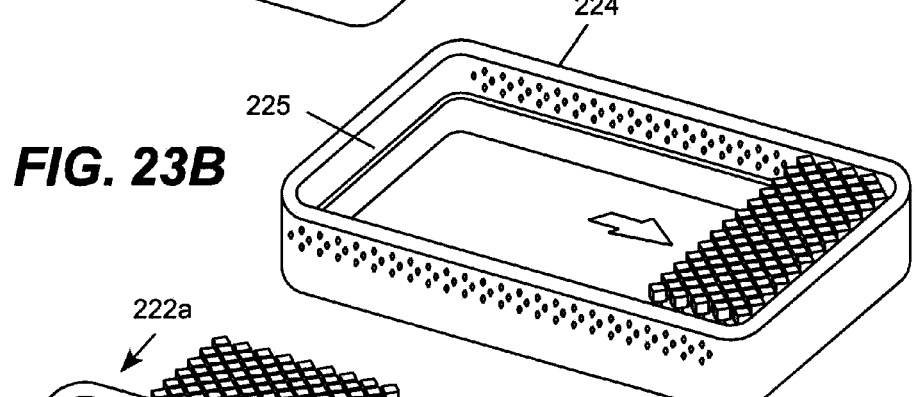
Figure 23C:
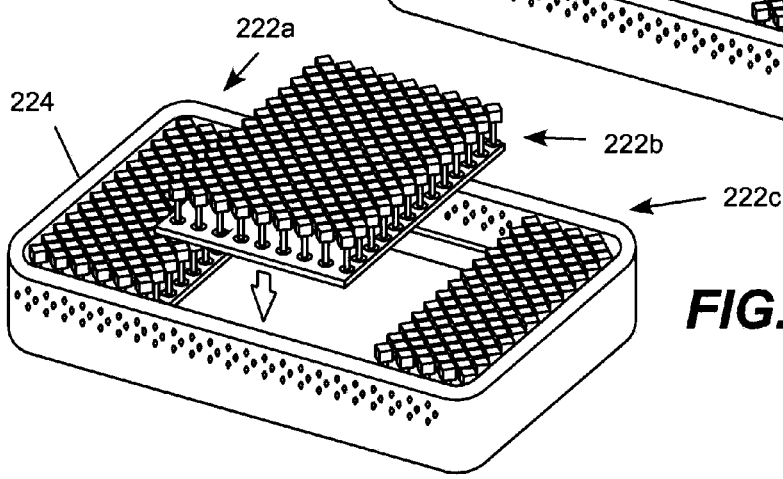
Figure 23D:
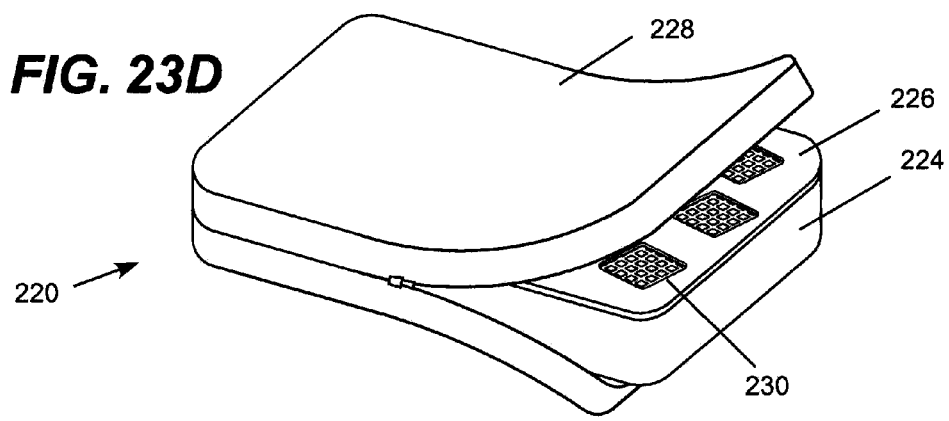

FIGS. 23A-23D are perspective diagrams illustrating a customer assembly procedure for the modular plunger matrix mattress 220. The customer unfolds the edge frame 224 and inserts the plunger matrix 222*a*, 222*b* and 222*c* in place with the plunger support platforms located on the flange 225 of the edge frame as shown in the series of diagrams 23A-C. The customer then places the foam pad 226 on top of the plunger matrix and zips one or more envelopes represented by the layer 228, typically including at least a foam layer and an outer cover, over the assembly as shown in FIG. 23D. The foam pad 226 in this example includes a number of lattice covered ventilation windows represented by the enumerated window 230. The outer cover is typically constructed from a sturdy, breathable, machine washable fabric. The cover may also include similar or other suitable types of ventilation structures.

Each plunger matrix section is configured for shipping within a respective box, while the edge frame is configured to be folded for shipping within a separate box. The top pad and cover are also configured to be folded or rolled and placed within the same box as the edge frame to create a multi-box shipping configuration for the modular mattress assembly.

Figure 24A:
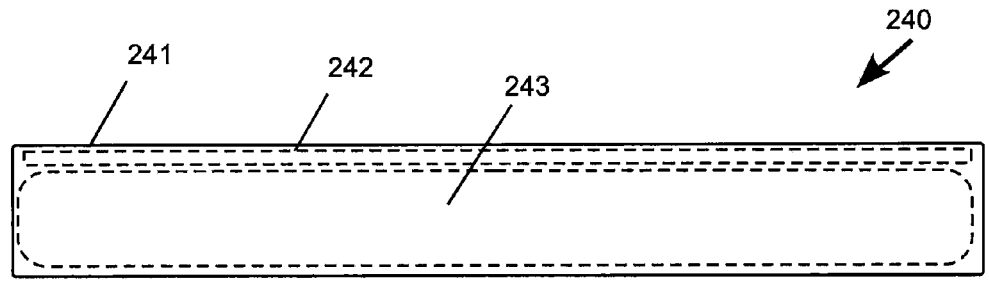
FIGS. 24A-24C are side views of a folding plunger matrix mattress configured for use with a mechanically adjustable bed frame.
Figure 24B:
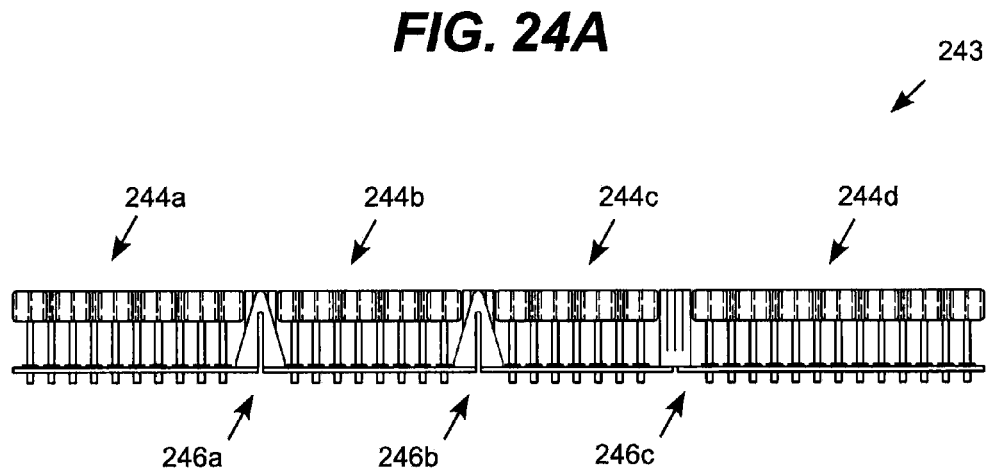
Figure 24C:
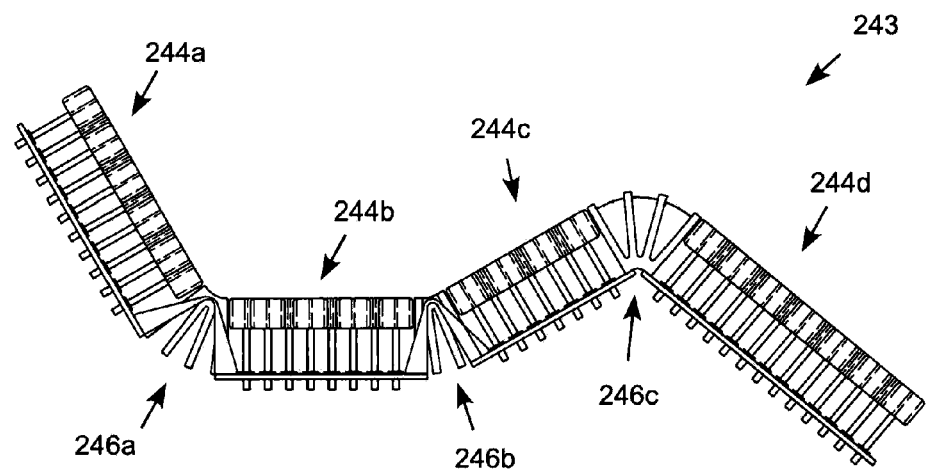

FIGS. 24A-24C are side views of a folding plunger matrix mattress 240 configured for use with a mechanically adjusting bed frame. FIG. 24A is a side view of the assembled mattress, which may be configured as a modular unit similar to the mattress 220 described with reference to FIG. 22. The basic elements of the mattress are a cover 241, a top pad 242 and a mattress assembly including an edge frame (not shown) and a plunger matrix 243. FIG. 24B is a side view of the plunger matrix 243, which is configured as four sections 244*a*-244*d* connected by flexible connectors 246*a*-246*c*. FIG. 24C illustrates the flexible connectors allowing the plunger matrix to flex to accommodate a mechanically adjusting bed frame. The connectors may be configured to slide onto the plunger matrix platform sections and may be secured in place by the edge frame as well as other suitable fasteners or cooperating structures.

For all of the embodiments described above, a range of specific materials may be utilized for the various components, which may generally be varied in size, shape and other characteristic within ranges of suitable parameters as matters of design choice. The following material specifications are provided for certain representative embodiments to aid in enablement and, while they are intended to be suitable for representative embodiments, the invention is not limited to these particular materials or embodiments.

Referring to FIGS. 4 and 6, in a particular embodiment exhibiting desirable weight, cost, strength, and ease of assembly characteristics, the top pad 12 may be constructed from standard polyurethane foam (PUF), viscoelastic PUF, latex foam, PUF with gel components, PUF with a phase changing material (PCM), polyethylene foam (PEF), reticulated foam or other suitable materials. The edge frame 15 may be constructed from PUF, PEF, thermoplastic polymers or other suitable materials. The cover 17 may be constructed from fabric, such as a woven or knitted fabric including fibers made of polypropylene, polyester, Rayon®, Modal®, Tencel®, cotton, wool or other suitable materials. The foam blocks 28a and 28b may be constructed from standard PUF, viscoelastic PUF, latex foam, PUF with gel components, PUF with a PCM, PEF, reticulated foam or other suitable materials. The plunger support platform 21 and the support board 66 may be constructed from plastic, wood, a Sintra®-polystyrene foam-Sintra® sandwich, bio-composite or another suitable material. The bottom frames 42 and 62 may be constructed from wood, metal, plastic or another suitable material.

Referring to the combined plunger matrix and coil spring embodiment shown in FIG. 10, the coil springs in the head and foot sections 102 and 103 may be coil springs typically utilized in mattresses. The foam frame 104 may be Acetal®, Delrin® or another suitable material. The foam base blocks 105a and 105b may be standard PUF, viscoelastic PUF, latex foam, PUF with gel components, PUF with a PCM, PEF, reticulated foam, combinations of these components, or other suitable materials. The platform support frame 106 may be plastic, wood, a Sintra®-polystyrene foam-Sintra® sandwich, bio-composite or another suitable material. The bottom panel 108 may be a flame retardant nonwoven material, or other suitable materials. This embodiment may include a top pad typically constructed from PUF, viscoelastic PUF, latex foam, PUF with gel components, PUF with a phase changing material (PCM), PEF, reticulated foam and/or other suitable materials and a skirt, such as a fire retardant (FR) knitted barrier or FR highloft nonwoven material, other types of woven or non-woven fabrics, or other suitable materials.

Referring to the illustrative plunger 16 shown in FIG. 12, the foam head 23 may be a molded component constructed from PUF, PEF or other suitable materials. The pin 24 typically includes a shaft with an X cross-section with four elongated fins [approximately ⅛ inch thick] and may include reinforcing flanges along the fins to add rigidity. The pin 24 may be constructed from ABS. The pin guide 110 and bearings 124, 126 may be molded components constructed from Acetal®, Delrin® or another suitable material. The foam collar 25 may be a molded component constructed from PUF, PEF or other suitable materials. The end cap 128 may be a molded component constructed from PUF, PEF or other suitable materials. The bushing 114 may be a molded component constructed from Santoprene® other suitable materials. The height adjustment collar may also be a molded component constructed from polypropylene, high density polyethylene or other suitable materials.

A variety of collars and springs may be employed to provide different spring and dampening characteristics. To specify one example spring, which is necessarily varied within a range from the base specification to implement customized support profiles, an plunger spring may have a diameter of 1.28 inches and a wire thickness of 0.056 inches. For a dual-spring plunger, and additional inner spring may have a diameter of 1.02 inches and a wire thickness of 0.061 inches.

In a particular embodiment of the modular mattress 220 shown in FIG. 22 exhibiting desirable weight, cost, strength, and ease of assembly characteristics, the plunger support platforms 223a-223c may be constructed from plastic, wood, a Sintra®-polystyrene foam-Sintra® sandwich, bio-composite or another suitable material. The edge frame 224 may be constructed from PUF, PEF, thermoplastic polymers or other suitable materials with side wall dimensions of 1 to 4 inches. The top pad 226 may be constructed from standard PUF, viscoelastic PUF, latex foam, PUF with gel components, PUF with a PCM, PEF, reticulated foam or other suitable materials and may include other foam, batting and ventilation elements as matters of design choice. The outer cover 228 may be constructed from fabric, such as woven or knitted fabric including fibers made of polypropylene, polyester, Rayon, Modal, Tencel, cotton, wool or other suitable materials and may include ventilation components as a matter of design choice. For the folding embodiment shown in FIGS. 24A-24C, the edge connectors 246a-246c may be constructed from PUF, PEF, rubber or other suitable materials.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A modular mattress assembly, comprising:
  a plurality of plunger matrix sections configured for side-to-side assembly, each comprising a separate plunger matrix support platform suspending a plurality of foam padded plungers;
  a foldable edge frame configured to snugly receive and house the plurality of plunger matrix sections in side-to-side relation, the edge frame defining a flange on an internal surface of the edge frame configured to support the plunger matrix sections in side-to-side relation in a position allowing the plungers to move up and down within an internal space defined by the edge frame, wherein each plunger comprises a dampening device comprising a unitary foam collar, a segmented foam collar wherein each segment exhibits a different firmness characteristic, a collar exhibiting a progressive firmness characteristic, or a coil spring;
  a top pad configured to lay on top of the edge frame and the plurality of plunger matrix sections in side-to-side relation housed within the edge frame; and
  a cover configured to encapsulate the edge frame, the plunger matrix, and the top pad into a self-contained mattress unit.

2. The modular mattress assembly of claim 1, wherein:
  each plunger matrix section is configured for shipping within a respective box;
  the edge frame is configured to be folded for shipping within a separate box;
  the top pad and cover are configured to be folded or rolled and placed within the same box as the edge frame to create a multi-box shipping configuration for the modular mattress assembly.

3. The modular mattress assembly of claim 1, wherein:
  each plunger matrix section is configured for shipping within a respective box;

the edge frame is configured to be folded for shipping within a separate box;

the top pad and cover are configured to be folded or rolled and placed within the same box as the edge frame to create a multi-box shipping configuration for the modular mattress assembly.

4. The mattress assembly of claim 1, wherein the plungers organized into a plurality of zones defining a support profile in which the plungers of each zone are similarly configured while the plungers of different zones are configured differently to define a varying firmness characteristic of the support profile across the zones.

5. The mattress assembly of claim 4, wherein the support profile includes different firmness in head, shoulder, back, bottom, and leg sections of the profile.

6. The mattress assembly of claim 4, wherein the zones are defined at least in part by one or more of different spring types on plungers in different zones, different dampening devices on plungers in different zones, or different height adjustment collars captured on the springs of the plungers in different zones.

7. The mattress assembly of claim 4, wherein the zones are defined at least in part by different plunger heads exhibiting one or more of different materials, different shapes, or different sizes.

8. The mattress assembly of claim 1, wherein at least a portion of the plungers have heads with protrusions imparting a massage or other tactile characteristic to the heads.

9. The mattress assembly of claim 8, wherein the protrusions comprise ridges, dimples, or a combination of ridges and dimples.

10. The mattress assembly of claim 1, wherein each plunger further comprises a clip for facilitating removal of the plunger from its respective plunger matrix section after the mattress has been manufactured.

11. A mattress assembly, comprising:
a plurality of plunger matrix sections, each comprising a separate plunger matrix support platform, configured for side-to-side assembly;
a foldable edge frame configured to snugly receive and house the plurality of plunger matrix sections in side-to-side relation, the edge frame defining a flange on an internal surface of the edge frame configured to support the plunger matrix sections in side-to-side relation in a position allowing the plungers to move up and down within an internal space defined by the edge frame, wherein each plunger comprises nested springs causing the plunger to exhibit a non-linear spring characteristic;
a top pad configured to lay on top of the edge frame and the plurality of plunger matrix sections in side-to-side relation housed within the edge frame;
a cover configured to encapsulate the edge frame, the plunger matrix, and the top pad into a self-contained mattress unit;
wherein the plunger matrix sections define a support profile for a person lying on the mattress comprising plungers organized into a plurality of zones in which the plungers of each zone are similarly configured while the plungers of different zones are configured differently to define a varying firmness characteristic of the support profile across the zones.

12. The mattress assembly of claim 11, wherein the number of zones is greater than the number of plunger matrix sections.

13. A mattress assembly, comprising:
a plurality of plunger matrix sections, each comprising a separate plunger matrix support platform, configured for side-to-side assembly;
a foldable edge frame configured to snugly receive and house the plurality of plunger matrix sections in side-to-side relation, the edge frame defining a flange on an internal surface of the edge frame configured to support the plunger matrix sections in side-to-side relation in a position allowing the plungers to move up and down within an internal space defined by the edge frame;
a top pad configured to lay on top of the edge frame and the plurality of plunger matrix sections in side-to-side relation housed within the edge frame;
a cover configured to encapsulate the edge frame, the plunger matrix, and the top pad into a self-contained mattress unit;
wherein each plunger comprises:
a pin guide removably captured within an aperture through the plunger support platform comprising a flange positioned above the plunger support platform, a guide body extending from the flange through the aperture,
a clip for facilitating removal of the plunger from its respective plunger matrix section after the mattress has been manufactured,
a pin slidably received within the pin guide comprising a flange located above the flange of the pin guide and a shaft extending from the flange through the guide body,
a deformable head carried by the flange of the pin;
a tension spring having a first end fixed to the guide body and a second end located below the guide body positioned to receive a bottom end of the pin shaft, wherein the spring is configured to resiliently stretch with downward motion of the pin with respect to the pin guide, and
a dampening device captured around the shaft of the pin between the flange of the pin and the flange of the pin guide, wherein the dampening device is configured to resiliently deform with downward motion of the pin with respect to the pin guide.

14. The mattress assembly of claim 13, wherein the plunger matrix sections define two different support profiles for two person lying side-by-side on the mattress.

15. The mattress assembly of claim 14, wherein each support profile includes different firmness in head, shoulder, back, bottom, and leg sections of the profile.

16. The mattress assembly of claim 13, wherein each plunger further comprises a clip for facilitating removal of the plunger from its respective plunger matrix section after the mattress has been manufactured.

17. The mattress assembly of claim 13, wherein the plunger matrix sections define a support profile for a person lying on the mattress comprising plungers organized into a plurality of zones in which the plungers of each zone are similarly configured while the plungers of different zones are configured differently to define a varying firmness characteristic of the support profile across the zones.

18. The mattress assembly of claim 13, wherein the dampening device comprises a unitary foam collar, a segmented foam collar wherein each segment exhibits a different firmness characteristic, a collar exhibiting a progressive firmness characteristic, or a coil spring.

* * * * *